(12) United States Patent
ElBsat et al.

(10) Patent No.: US 9,355,069 B2
(45) Date of Patent: May 31, 2016

(54) SYSTEMS AND METHODS FOR DETERMINING THE UNCERTAINTY IN PARAMETERS OF AN ENERGY USE MODEL

(71) Applicant: Johnson Controls Technology Company, Holland, MI (US)

(72) Inventors: Mohammad N. ElBsat, Milwaukee, WI (US); Michael J. Wenzel, Oak Creek, WI (US)

(73) Assignee: Johnson Controls Technology Company, Holland, MI (US)

( * ) Notice: Subject to any disclaimer, the term of this patent is extended or adjusted under 35 U.S.C. 154(b) by 262 days.

(21) Appl. No.: 14/137,627

(22) Filed: Dec. 20, 2013

(65) Prior Publication Data

US 2015/0178633 A1    Jun. 25, 2015

(51) Int. Cl.
*G06F 17/16* (2006.01)
*G06N 7/00* (2006.01)
*G05B 15/02* (2006.01)

(52) U.S. Cl.
CPC ............. *G06F 17/16* (2013.01); *G05B 15/02* (2013.01); *G06N 7/005* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 8,532,808 B2 | 9/2013 | Drees et al. |
| 2011/0130886 A1 | 6/2011 | Drees et al. |
| 2011/0257911 A1 | 10/2011 | Drees et al. |
| 2012/0084063 A1 | 4/2012 | Drees et al. |
| 2012/0259583 A1 | 10/2012 | Noboa et al. |
| 2013/0085614 A1 | 4/2013 | Wenzel et al. |
| 2013/0086010 A1 | 4/2013 | Wenzel et al. |
| 2013/0325377 A1 | 12/2013 | Drees et al. |

FOREIGN PATENT DOCUMENTS

WO    WO-2011/100255 A3    8/2011

OTHER PUBLICATIONS

Ruch et al., Prediction Uncertainty of Linear Building Energy Use Models with Autocorrelated Residuals, Feb. 1999, Journal of Solar Energy Engineering, vol. 121, pp. 63-68.*

* cited by examiner

Primary Examiner — Alan Chen
(74) Attorney, Agent, or Firm — Foley & Lardner LLP

(57) ABSTRACT

Systems and methods for determining the uncertainty in parameters of a building energy use model are provided. A disclosed method includes receiving an energy use model for a building site. The energy use model includes one or more predictor variables and one or more model parameters. The method further includes calculating a gradient of an output of the energy use model with respect to the model parameters, determining a covariance matrix using the calculated gradient, and using the covariance matrix to identify an uncertainty of the model parameters. The uncertainty of the model parameters may correspond to entries in the covariance matrix.

14 Claims, 7 Drawing Sheets

SYSTEMS AND METHODS FOR DETERMINING THE UNCERTAINTY IN PARAMETERS OF AN ENERGY USE MODEL

BACKGROUND

The present disclosure relates generally to systems and methods for analyzing energy consumption model data, and more particularly to systems and methods for determining an uncertainty in the parameters of a building energy use model.

Many buildings are equipped with a variety of energy-consuming equipment and devices. For example, a building may be equipped with heating, ventilation, and air conditioning (HVAC) equipment that consume energy to regulate the temperature, humidity, and/or air quality in the building. Other exemplary types of energy-consuming building equipment include lighting fixtures, security equipment, data networking infrastructure, and other such equipment.

The energy efficiency of buildings has become an area of interest in recent years. For an energy provider, a high energy efficiency of the buildings that it services helps to alleviate strains placed on the energy provider's electrical generation and transmission assets. For a building operator, a high energy efficiency corresponds to greater financial savings because less energy is consumed by the building.

One way to improve the energy efficiency of a building is through an accurate model of the building's energy use. An energy use model for a building typically predicts the building's total energy consumption as a function of one or more predictor variables and one or more model parameters. Some energy use models include a balance point. A balance point (or a break even temperature) is a threshold temperature value defining a range of outside air temperatures for which heating or cooling is required to maintain the temperature inside the building within an acceptable range.

Previous modeling techniques allow for some of the parameters in a building energy use model to be estimated and for their uncertainties to be determined. However, previous modeling techniques do not allow the uncertainty in a balance point estimate to be calculated. It remains difficult and challenging to determine the uncertainty associated with many parameters in a building energy use model, including balance point parameters.

SUMMARY

One implementation of the present disclosure is a method for determining the uncertainty in parameters of a building energy use model. The method includes receiving an energy use model for a building site. The energy use model includes one or more predictor variables and one or more model parameters. The method further includes calculating a gradient of an output of the energy use model with respect to the model parameters, determining a covariance matrix using the calculated gradient, and using the covariance matrix to identify an uncertainty of the model parameters. The uncertainty of the model parameters may correspond to entries in the covariance matrix.

In some embodiments, at least one of the model parameters is a balance point parameter defining a range of outside air temperatures within which the output of the energy use model depends on the outside air temperature.

In some embodiments, at least one of the predictor variables is a function of a balance point parameter of the energy use model. In such embodiments, determining the covariance matrix may include identifying a predictor variable in the energy use model that is a function of the balance point parameter, identifying a regression coefficient associated with the identified predictor variable, and using a function of the identified regression coefficient as a gradient of the output of the energy use model with respect to the balance point parameter. In some embodiments, the function of the identified regression coefficient is a product of the identified regression coefficient and a variable representing a total time duration during which the outside air temperature is within the outside air temperature range.

In some embodiments, the energy use model is at least one of a non-linear energy use model, a piecewise linear energy use model, a three-parameter energy use model, and a five-parameter energy use model. In some embodiments, determining the covariance matrix includes determining a standard error of regression for the energy use model.

In some embodiments, the method further includes obtaining a plurality of data points and estimating the model parameters using the plurality of data points. Each of the data points may include a value for the one or more predictor variables and an associated energy consumption value for the building site. In some embodiments, obtaining the plurality of data points includes, for each of the data points, receiving at least one of an observed temperature value and an observed enthalpy value, and calculating the value of the predictor variable using the observed temperature value or the observed enthalpy value.

In some embodiments, the one or more predictor variables include at least one weather-related predictor variable. The weather-related predictor variable may be at least one of cooling degree days, heating degree days, cooling energy days, heating energy days, temperature, and enthalpy.

In some embodiments, the method further includes updating the energy use model using the uncertainty in the model parameters, applying inputs to the updated energy use model, conducting a performance analysis using the updated energy use model, and providing an output using a result of the performance analysis.

In some embodiments, the method further includes using the uncertainty of the model parameters to perform a multivariate uncertainty analysis of the model parameters. In some embodiments, multivariate uncertainty analysis allows for a visualization of a correlation between two or more of the model parameters. In some embodiments, the multivariate uncertainty analysis allows for performing a multivariate peer analysis of the model parameters.

Another implementation of the present disclosure is a method for determining the uncertainty in parameters of a building energy use model. The method includes receiving an energy use model for a building site. The energy use model includes one or more predictor variables and one or more model parameters. The method further includes obtaining a set of data points and generating multiple samples from the set of data points. Each of the data points may include a value for the one or more predictor variables and an associated energy consumption value for the building site. Each of the samples may include a plurality of data points selected from the set of data points. The method further includes, for each of the multiple samples, estimating the model parameters using the plurality of data points associated with the sample and determining an uncertainty in the model parameters using the multiple estimates of the model parameters.

In some embodiments, obtaining the set of data points includes, for each of the data points, receiving at least one of an observed temperature value and an observed enthalpy value, and calculating a value of one or more of the predictor variables using the observed temperature value or the observed enthalpy value.

In some embodiments, the one or more predictor variables include at least one weather-related predictor variable. The weather-related predictor variable may be at least one of cooling degree days, heating degree days, cooling energy days, heating energy days, temperature, and enthalpy.

In some embodiments, at least one of the model parameters is a balance point parameter defining a range of outside air temperatures within which an output of the energy use model depends on the outside air temperature.

In some embodiments, generating multiple samples from the set of data points includes, for each of the multiple samples, replacing a predetermined number of data points in the set of data points with an equal number of data points selected randomly from the set of data points. Each of the multiple samples may include the same number of data points as the original set of multiple data points.

In some embodiments, generating multiple samples from the set of data points includes, for each of the multiple samples, removing a predetermined number of data points from the set of multiple data points. Each of the multiple samples may include less data points than the set of data points. In some embodiments, the predetermined number of data points is one data point and each of the multiple samples includes one less data point than the original set of multiple data points.

In some embodiments, the method further includes updating the energy use model using the uncertainty in the model parameters, applying inputs to the updated energy use model, conducting a performance analysis using the updated energy use model, and providing an output using a result of the performance analysis.

Another implementation of the present disclosure is a system for determining the uncertainty in parameters of a building energy use model. The system includes a data storage device and a processing circuit configured to receive an energy use model for a building site and to store the energy use model in the data storage device. The energy use model may include one or more predictor variables and one or more model parameters. The processing circuit is further configured to calculate a gradient of an output of the energy use model with respect to the model parameters, to determine a covariance matrix using the calculated gradient, and to use the covariance matrix to identify an uncertainty of the model parameters. The uncertainty of the model parameters may correspond to entries in the covariance matrix.

In some embodiments, the energy use model is at least one of a non-linear energy use model, a piecewise linear energy use model, a three-parameter energy use model, and a five-parameter energy use model.

In some embodiments, at least one of the model parameters is a balance point parameter defining a range of outside air temperatures within which the output of the energy use model depends on the outside air temperature.

In some embodiments, at least one of the predictor variables is a function of a balance point parameter of the energy use model. In such embodiments, determining the covariance matrix may include identifying, in the energy use model, a predictor variable that is a function of the balance point parameter, identifying a regression coefficient associated with the identified predictor variable, and using a function of the identified regression coefficient as a gradient of the output of the energy use model with respect to the balance point parameter. In some embodiments, the function of the identified regression coefficient is a product of the identified regression coefficient and a variable representing a total time duration during which the outside air temperature is within the outside air temperature range.

In some embodiments, the processing circuit is further configured to update the energy use model using the uncertainty in the model parameters, apply inputs to the updated energy use model, conduct a performance analysis using the updated energy use model, and provide an output using a result of the performance analysis.

In some embodiments, the processing circuit is further configured to use the uncertainty of the model parameters to perform a multivariate uncertainty analysis of the model parameters. In some embodiments, multivariate uncertainty analysis allows for a visualization of a correlation between two or more of the model parameters. In some embodiments, the multivariate uncertainty analysis allows for performing a multivariate peer analysis of the model parameters.

Another implementation of the present disclosure is a method for analyzing an energy performance of a building site. The method includes determining an uncertainty in a break even temperature parameter of an energy use model for the building site and using the uncertainty in the break even temperature parameter to analyze the energy performance of the building site.

In some embodiments, determining the uncertainty in the break even temperature parameter includes simultaneously determining the uncertainty of the break even temperature parameter and an uncertainty of one or more additional parameters of the energy use model and using the simultaneously determined uncertainties to improve an accuracy of the energy performance analysis.

In some embodiments, analyzing the energy performance of the building site includes performing a peer analysis of one or more energy use model parameters for a class of buildings including the building site. The peer analysis may include calculating a difference between an energy use model parameter for the building site and a mean of the energy use model parameters for the class of buildings, detecting an outlier model parameter based on a result of the calculation, and using the uncertainty in the break even temperature parameter to improve an accuracy of the detection.

In some embodiments, analyzing the energy performance of the building site includes performing a temporal analysis of one or more energy use model parameters for the building site. The temporal analysis may include calculating a difference between a value for an energy use model parameter at a particular time and a mean of a set of values for the energy use model parameter. The set of values may include a plurality of values for the energy use model parameter at various times. The temporal analysis may further include using the uncertainty in the break even temperature parameter to improve an accuracy of the calculation and detecting an outlier model parameter based on a result of the calculation.

In some embodiments, analyzing the energy performance of the building site includes monitoring changes to one or more parameters in the energy use model for the building site, detecting the existence of a fault condition using a monitored change to the energy use model parameters, and using the uncertainty in the break even temperature parameter to improve an accuracy of the detection.

In some embodiments, analyzing the energy performance of the building site includes calculating an energy savings opportunity for the building site and using the uncertainty in the break even temperature parameter to improve an accuracy of the calculation.

In some embodiments, the method further includes updating the energy use model using the uncertainty in the model parameters, applying inputs to the updated energy use model, conducting a performance analysis using the updated energy use model, and providing an output using a result of the performance analysis.

Another implementation of the present disclosure is one or more non-transitory computer-readable media having computer-executable instructions stored therein. The instructions, when executed by one or more processors may cause the one or more processors to perform operations including receiving an energy use model for a building site. The energy use model includes one or more predictor variables and one or more model parameters. The operations further include calculating a gradient of an output of the energy use model with respect to the model parameters, determining a covariance matrix using the calculated gradient, and using the covariance matrix to identify an uncertainty of the model parameters. The uncertainty of the model parameters may correspond to entries in the covariance matrix.

Another implementation of the present disclosure is one or more non-transitory computer-readable media having computer-executable instructions stored therein. The instructions, when executed by one or more processors may cause the one or more processors to perform operations including receiving an energy use model for a building site. The energy use model includes one or more predictor variables and one or more model parameters. The operations further include obtaining a set of data points and generating multiple samples from the set of data points. Each of the data points may include a value for the one or more predictor variables and an associated energy consumption value for the building site. Each of the samples may include a plurality of data points selected from the set of data points. The operations further include, for each of the multiple samples, estimating the model parameters using the plurality of data points associated with the sample and determining an uncertainty in the model parameters using the multiple estimates of the model parameters.

Another implementation of the present disclosure is one or more non-transitory computer-readable media having computer-executable instructions stored therein. The instructions, when executed by one or more processors may cause the one or more processors to perform operations including determining an uncertainty in a break even temperature parameter of an energy use model for the building site and using the uncertainty in the break even temperature parameter to analyze the energy performance of the building site. In some embodiments, determining the uncertainty in the break even temperature parameter includes simultaneously determining the uncertainty of the break even temperature parameter and an uncertainty of one or more additional parameters of the energy use model and using the simultaneously determined uncertainties to improve an accuracy of the energy performance analysis.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
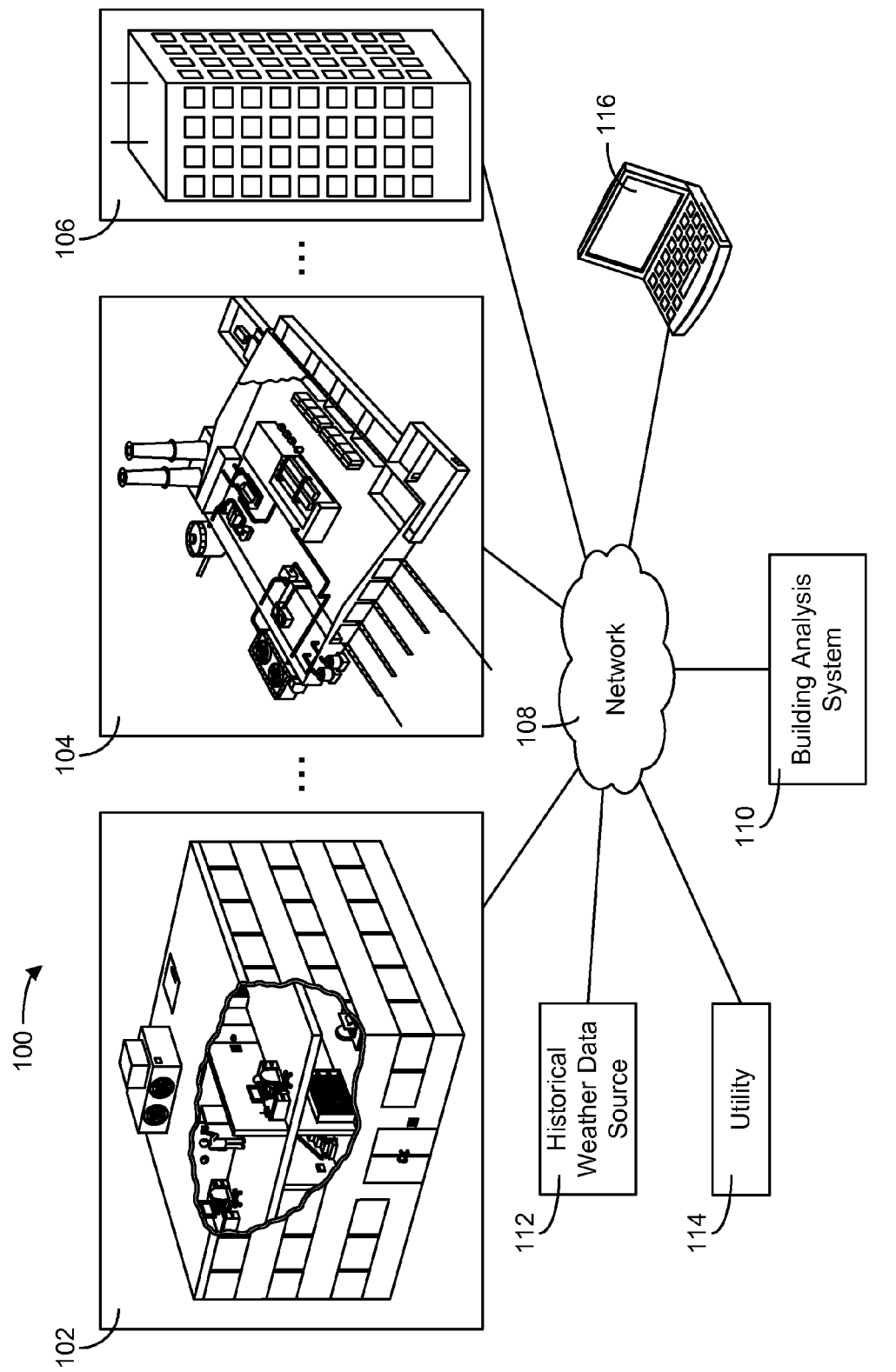
FIG. 1 is a drawing of a building data acquisition system including a building analysis system configured to collect, store, and/or analyze performance data related to a building's energy use, shown according to an exemplary embodiment.

Referring generally to the FIGURES, systems and methods for determining the uncertainty in parameters of a building energy use model and components thereof are shown, according to various exemplary embodiments. A building energy use model generally describes the energy usage of a building or building site in terms of one or more predictor variables (e.g., weather data, occupancy data, etc.) and one or more model parameters. Building energy use models may take a variety of forms including parametric models (e.g., linear regression, non-linear regression, etc.), non-parametric models (e.g., neural networks, kernel estimation, Bayesian, etc.) or something in between (e.g., Gaussian process models, etc.).

Some building energy use models include a balance point. A balance point (or a break even temperature) is a threshold temperature value defining a range of outside air temperatures for which heating or cooling is required to maintain the temperature inside the building within an acceptable range. For example, a cooling balance point may be a threshold outside air temperature above which cooling is required and a heating balance point may be a threshold outside air temperature below which heating is required. The value of the balance point may be used to calculate the value of a weather-related predictor variable (e.g., cooling degree days (CDD), heating degree days (HDD), etc.) used in a change-point energy use model.

The systems and methods described herein may be used to determine the uncertainty in the balance points and/or other parameters of a building energy use model. In some embodiments, a regression technique is used to estimate values for coefficients of the energy use model (i.e., the regression model coefficients) and one or more balance points (e.g., a heating balance point and/or a cooling balance point). The balance points may be added to a parameter vector containing the regression model coefficients. Unlike traditional techniques which estimate uncertainty values for only the regression model coefficients, the systems and methods of the present disclosure allow for estimating the uncertainties in the values of both the regression model coefficients and the balance points simultaneously. As used herein, the term "model parameters" describes all of the parameters of a building energy use model including both regression model coefficients and balance point parameters.

Adding the balance points to the parameter vector containing the regression model coefficients allows the uncertainties in the balance points to be determined along with the uncertainties of the regression model coefficients. For example, a gradient of an output of the energy use model (e.g., a predicted energy consumption) with respect to the model parameters can be calculated and used to generate a covariance matrix. The uncertainty in the balance point parameters may correspond to entries in the covariance matrix and may be identified by inspection thereof.

Estimating the uncertainties in the regression model coefficients and the balance points simultaneously results in a more accurate calculation of the uncertainties in the model parameters compared with the uncertainties obtained using traditional regression techniques. Estimating the uncertainties in the regression model coefficients and the balance points simultaneously also allows for a multivariate analysis. Using the systems and methods of the present disclosure, the uncertainties in the balance point parameters can be calculated and the uncertainties in the regression model coefficients can be determined more accurately than with traditional techniques.

Referring now to FIG. 1, an illustration of a building data acquisition system 100 is shown, according to an exemplary embodiment. Building data acquisition system 100 may be configured to collect, store, and/or analyze performance data related to a building's energy use. The performance data for the building may be used, for example, to model the building's energy usage, predict related parameters in the energy use model, determine an appropriate parameter order for the energy use model, and/or estimate the uncertainties associated with various model parameters.

Building data acquisition system 100 is shown to include buildings 102-106. Buildings 102-106 may include any number of buildings (e.g., a first through a nth building) and any type of buildings (e.g., commercial buildings, residential buildings, industrial buildings, etc.). For example, building 102 may be an office building, building 104 may be a manufacturing facility, and building 106 may be a hospitality facility, such as a hotel. Other exemplary buildings in buildings 102-106 may include, but are not limited to, data centers, schools, shipping facilities, and government buildings. Buildings 102-106 may include any combination of building types.

Buildings 102-106 may be located within the same geographic regions as one another or across different geographic regions. For example, building 102 and building 104 may be located in the same city, while building 106 may be located in a different city. Different levels of granularity may be used to distinguish buildings 102-106 as being located in the same geographic region. For example, geographic regions may be divided by country, state, city, metropolitan area, time zone, zip code, area code, latitude, longitude, growing zone, combinations thereof, or using any other geographic classification system. In some embodiments, a building's geographic location may be used as a proxy for its climatic zone. For example, data regarding a building's location in Hawaii may be used to determine that the building is located in a tropical climate.

In some embodiments, each of buildings 102-106 may be part of a building site. A building site may include one or more of buildings 102-106 and typically includes buildings that are located proximate to each other and/or interconnected. A single HVAC system, water system, and/or electric grid may service multiple buildings that are part of the same building site. An energy use model may be developed for individual buildings, for a building site, or for both individual buildings and a building site.

Buildings 102-106 may be equipped with sensors and other monitoring devices configured to measure performance data related to the building's energy consumption. For example, buildings 102-106 may have devices (e.g., computing devices, power meters, etc.) configured to measure the water consumption, energy consumption, and energy demand of buildings 102-106. Other forms of performance data may include a measured temperature in one or more zones of a building, dimensions of the building (e.g., square footage, etc.), and/or any other value that relates to the building's energy usage profile. In some embodiments, performance data includes data used in a building automation system. For example, performance data may include control parameters (e.g., set points, tuning parameters, threshold values, etc.) used to regulate the temperature in the building and/or timing data used to automatically turn on or off lighting within the building (e.g., at night, when the building is unoccupied, according to a set schedule, etc.).

In some embodiments, readily available data may be used to determine and model a building's energy consumption. For example, billing data received from a utility 114 may be used to determine a building's energy consumption and the financial costs associated with the energy consumption. Such an approach may simplify and reduce the cost of performing the energy analysis over approaches that rely heavily on sensor data from a building.

In some embodiments, performance data includes weather data for a region in which buildings 102-106 are located. The weather data may be generated by weather-sensing equipment at buildings 102-106. For example, buildings 102-106 may be equipped with temperature sensors that measure the outside air temperature. In other embodiments, buildings 102-106 may be configured to receive weather data from an external weather data source.

In some embodiments, performance data includes weather data for a typical meteorological year (TMY) received from historical weather data source 112 (e.g., a computer system of the National Oceanic and Atmospheric Administration or similar data source). In the United States of America, the first set of TMY data was collected between 1948-1980 from various locations throughout the country. A second set of TMY data (TMY2), which also includes data regarding precipitable moisture, was collected between 1961-1990. In addition, a third set of TMY data (TMY3), was collected from many more locations than TMY2 data over the span of 1976-1995. Regardless of the version used, TMY data may be used to compare current conditions to normal or predicted conditions, in some embodiments. In further embodiments, TMY data may be used to predict future conditions of a building (e.g., by using the historical data to predict typical future weather conditions) or future energy consumptions by a building. For example, TMY data may be used to predict an average outdoor temperature change for a building during the upcoming month of March. TMY data may be stored by the building automation systems of buildings 102-106 or building analysis system 110 and used to model the heating and cooling needs of buildings 102-106. As used herein, "TMY data" may refer to any version or set of TMY data (e.g., TMY2 data, TMY3 data, etc.).

Performance data may be collected for individual buildings 102-106 or for a building site. For example, energy usage data (e.g., received from utility 114 or otherwise) for multiple buildings may be combined into a total energy usage for a building site. Buildings that are part of the same building site may share the same outside air temperature, outside air enthalpy, or other weather-related predictor variables (e.g., cooling degree days, heating degree days, cooling energy days, heating energy days, etc.).

Still referring to FIG. 1, building data acquisition system 100 is shown to include a network 108. Network 108 may be any form of computer network that relays information between buildings 102-106 and a building analysis system 110. For example, network 108 may include the Internet and/or other types of data networks, such as a local area network (LAN), a wide area network (WAN), a cellular network, satellite network, or other types of data networks. Network 108 may also include any number of computing devices (e.g., computer, servers, routers, network switches, etc.) that are configured to receive and/or transmit data within network 108. Network 108 may further include any number of hardwired and/or wireless connections. For example, building 102 may communicate wirelessly (e.g., via WiFi, ZigBee, cellular, radio, etc.) with a transceiver that is hardwired (e.g., via a fiber optic cable, a CAT5 cable, etc.) to other computing devices in network 108.

Still referring to FIG. 1, building data acquisition system 100 is shown to include a building analysis system 110. Building analysis system 110 may include one or more electronic devices connected to network 108. In various embodiments, building analysis system 110 may be a computer server (e.g., an FTP server, file sharing server, web server, etc.) or a combination of servers (e.g., a data center, a cloud computing platform, etc.). Building analysis system 110 may include a processing circuit configured to perform the functions and processes described herein.

Building analysis system 110 may be configured to obtain performance data for buildings 102-106 (e.g., either directly from buildings 102-106 or from another computing device connected to network 108). The performance data may include a plurality of data points. Each of the data points may include a value for a predictor variable (e.g., outside air temperature or enthalpy, cooling degree days, heating degree days, cooling energy days, heating energy days, etc.) and an associated energy consumption value for a building or building site. The performance data may be received by building analysis system 110 periodically, in response to a request for data from building analysis system 110, in response to receiving a request from a client device 116 (e.g., a user operating client device 116 may request that the building data be sent by the computing device), or at any other time.

In some embodiments, building analysis system 110 is configured to model the energy usage of buildings 102-106 using the performance data. In other embodiments, building analysis system receives an energy use model for buildings 102-106 from an external source (e.g., within building data acquisition system 100 or otherwise). The building energy use model generated or received by building analysis system 110 may be a parametric model or a non-parametric model. In some embodiments, building analysis system 110 may perform LEAN energy analysis using readily available data (e.g., utility billing data, weather data, etc.) to model the energy usage profiles of buildings 102-106 and/or to predict an energy cost for buildings 102-106. Building analysis system 110 may generate and provide various reports to client 116, which may be located within one of buildings 102-106 or at another location.

In some embodiments, building analysis system 110 may be implemented at one or more of buildings 102-106. For example, building analysis system 110 may be integrated as part of a building automation system (BAS) for buildings 102-106 (e.g., as part of a centralized BAS or in a distributed implementation). In a distributed implementation, performance data may be shared among the distributed components of building analysis system 110 via network 108. For example, computing devices at buildings 102-106 may be configured to collaboratively share performance data regarding their respective building's energy consumption and demand. The sharing of performance data among the buildings' respective computing devices may be coordinated by one or more of the devices, or by a remote coordination service (e.g., a supervisory controller or remote server connected to network 108). Building analysis system 110 is described in greater detail with reference to FIG. 3.

Figure 2:
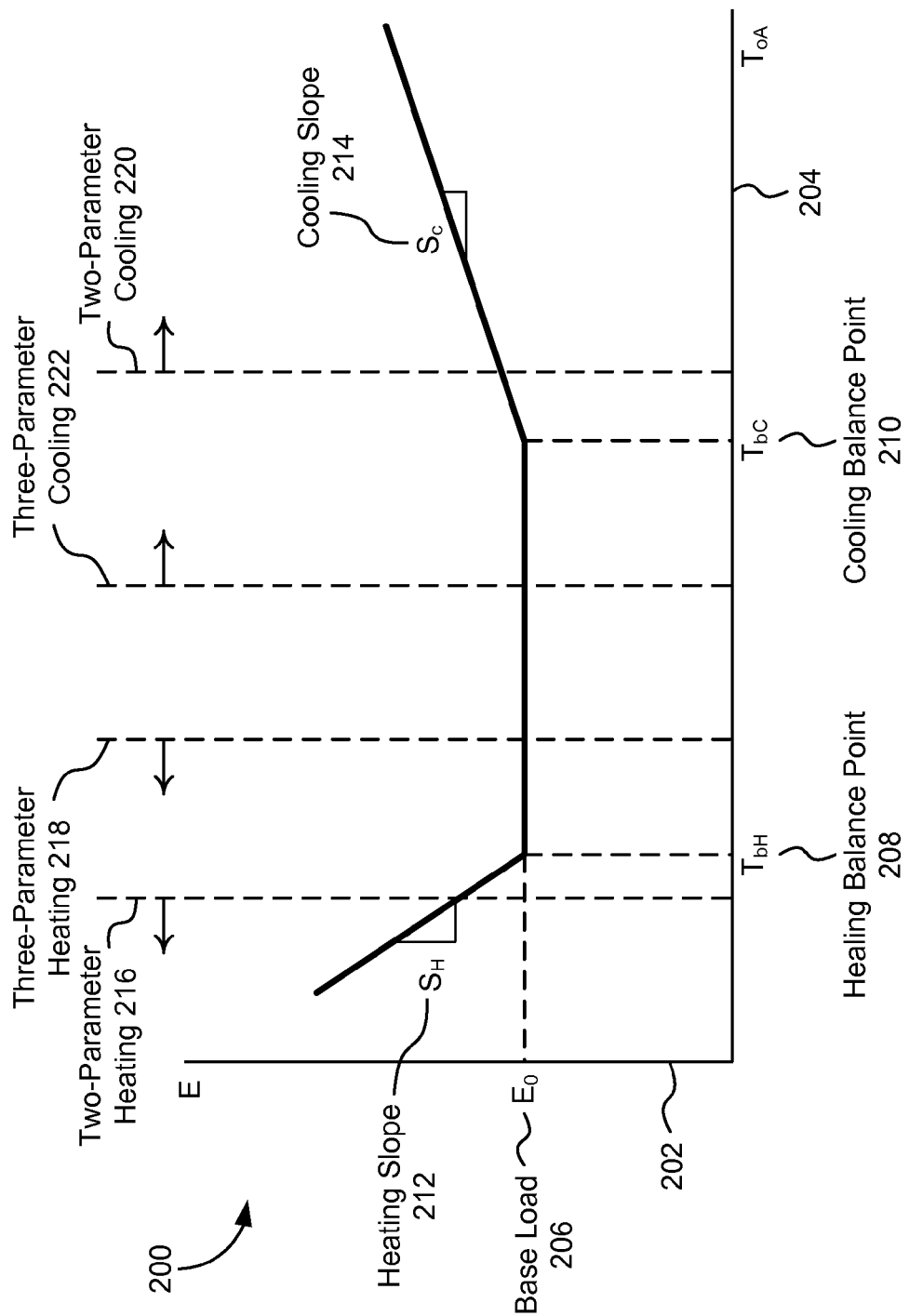
FIG. 2 is a drawing of an energy use profile for a building site illustrating a heating balance point, a heating slope, a cooling balance point, and a cooling slope, according to an exemplary embodiment.

Referring now to FIG. 2, an energy use profile 200 for a building or building site is shown, according to an exemplary embodiment. In general, a number of different factors may affect the energy use of a building. For example, weather-related variables such as the air temperature outside the building may affect the amount of energy required to heat or cool the building to a setpoint temperature. In some embodiments, the building's energy use profile when cooling the building may differ from the building's energy use profile when heating the building. In some embodiments, the energy use model for the building includes parameters relating to both heating and cooling the building (e.g., for a four-parameter model or a five-parameter model). In other embodiments, the energy use model for the building includes parameters relating to either heating or cooling the building, but not both (e.g., for a two-parameter model or a three parameter model).

Energy use profile 200 is shown as an x-y plot with building energy use E plotted along a first axis 202 and outdoor air temperature $T_{OA}$ plotted along a second axis 204. In various embodiments, the building's energy use E may be an energy consumption (e.g., measured in kWh) or an energy cost associated with the building's energy consumption (e.g., measured in dollars or other units of currency). Energy consumption and/or energy cost information may be obtained, for example, from billing data provided by utility 114. In some embodiments, the outdoor air temperature $T_{OA}$ may be measured using sensors located at or near the building over a particular time period. Energy use profile 200 is shown to include a base energy load $E_0$ 206, a heating balance point $T_{bH}$ 208, a cooling balance point $T_{bC}$ 210, a heating slope $S_H$ 212, and a cooling slope $S_C$ 214.

Base energy load $E_0$ 206 may be a baseline or fixed energy usage that does not depend on the outdoor air temperature $T_{OA}$. For example, base energy load $E_0$ 206 may be a function of the energy consumption of the building's lighting, computer systems, security systems, and other such electronic devices in the building. Since the energy consumption of these devices does not change as a function of the outdoor air temperature $T_{OA}$, base energy load $E_0$ 206 may be used to represent the portion of the building's energy consumption that is not a function of the outdoor air temperature $T_{OA}$.

Heating slope $S_H$, 212 may correspond to the change in energy consumption or energy costs that results when the outdoor air temperature $T_{OA}$ drops below a heating balance point $T_{bH}$ 208 (e.g., a break even temperature). For example, assume that heating balance point $T_{bH}$ 208 for a building is 55° F. When the outdoor air temperature $T_{OA}$ is at or above 55° F., only an energy expenditure equal to base load $E_0$ 206 may be needed to maintain the internal temperature of the building within an acceptable temperature range. However, additional energy may be needed if the outdoor air temperature $T_{OA}$ drops below 55° F. (e.g., to provide mechanical heating to the interior of the building). As the outdoor air temperature $T_{OA}$ decreases, the amount of energy needed to heat the building increases at a rate corresponding to heating slope $S_H$ 212.

Cooling slope $S_C$ 214 may correspond to the change in energy consumption or energy costs that result when the outdoor air temperature $T_{OA}$ rises above a cooling balance point $T_{bC}$ 210 (e.g., a break even temperature). For example, assume that cooling balance point $T_{bC}$ 210 for a building is 67° F. When the outdoor air temperature $T_{OA}$ is at or below 67° F., only an energy expenditure equal to base load $E_0$ 206 may be needed to maintain the internal temperature of the building. However, additional energy may be needed if the outdoor air temperature $T_{OA}$ rises above 67° F. (e.g., to provide mechanical cooling to the interior of the building). As the outdoor air temperature $T_{OA}$ increases, the amount of energy needed to cool the building increases at a rate corresponding to cooling slope $S_C$ 214.

Still referring to FIG. 2, energy use profile 200 may be associated with a building or building site having a five-parameter energy use model, where base energy usage $E_0$ 206, heating balance point $T_{bH}$ 208, cooling balance point $T_{bC}$ 210, heating slope $S_H$ 212, and cooling slope $S_C$ 214 correspond to the five parameters of the five-parameter model.

In some embodiments, not all five parameters may be necessary or appropriate to model a building's energy use. For example, if the building is located in a cold climate such that the outdoor air temperature $T_{OA}$ is never higher than heating balance point $T_{bH}$ 208, a two-parameter heating model may be appropriate. Parameters in the two-parameter heating model may include base energy load $E_0$ 206 and heating slope $S_H$ 212. An energy profile associated with a two-parameter heating model may be the portion of energy use profile 200 to the left of two-parameter heating line 216.

If the building is located in a hot climate such that the outdoor air temperature $T_{OA}$ is never lower than cooling balance point $T_{bC}$ 210, a two-parameter cooling model may be appropriate. Parameters in the two-parameter cooling model may include base energy load $E_0$ 206 and cooling slope $S_C$ 214. An energy profile associated with a two-parameter cooling model may be the portion of energy use profile 200 to the right of two-parameter cooling line 220.

If the building is located in a moderately cool climate such that the outdoor air temperature $T_{OA}$ is sometimes below heating balance point $T_{bH}$ 208 (e.g., $T_{OA} < T_{bH}$) and sometimes between heating balance point $T_{bH}$ 208 and cooling balance point $T_{bC}$ 210 (e.g., $T_{bH} < T_{OA} < T_{bC}$), or there is not a cooling balance point or cooling does not use the energy type being modeled, a three-parameter heating model may be appropriate. Parameters in the three-parameter heating model may include base energy load $E_0$ 206, heating balance point $T_{bH}$ 208, and heating slope $S_H$ 212. An energy profile associated with a three-parameter heating model may be the portion of energy use profile 200 to the left of three-parameter heating line 218.

If the building is located in a moderately warm climate such that the outdoor air temperature $T_{OA}$ is sometimes above cooling balance point $T_{bC}$ 210 (e.g., $T_{OA} > T_{bC}$) and sometimes between heating balance point $T_{bH}$ 208 and cooling balance point $T_{bC}$ 210 (e.g., $T_{bH} < T_{OA} < T_{bC}$), or there is not a heating balance point or heating does not use the energy type being modeled, a three-parameter cooling model may be appropriate. Parameters in the three-parameter cooling model may include base energy load $E_0$ 206, cooling balance point $T_{bC}$ 210, and cooling slope $S_C$ 214. An energy profile associated with a three-parameter cooling model may be the portion of energy use profile 200 to the right of three-parameter cooling line 222.

If the building transitions between supplying heating and cooling at a single balance point (e.g., the building's heating balance point $T_{bH}$ and cooling balance point $T_{bC}$ are equal), a four parameter model may be appropriate. The parameters in the four-parameter model may include base energy load $E_0$ 206, heating slope $S_H$ 212, cooling slope $S_C$ 214, and a single balance point which is both heating balance point $T_{bH}$ 208 and cooling balance point $T_{bC}$ 210.

Figure 3:
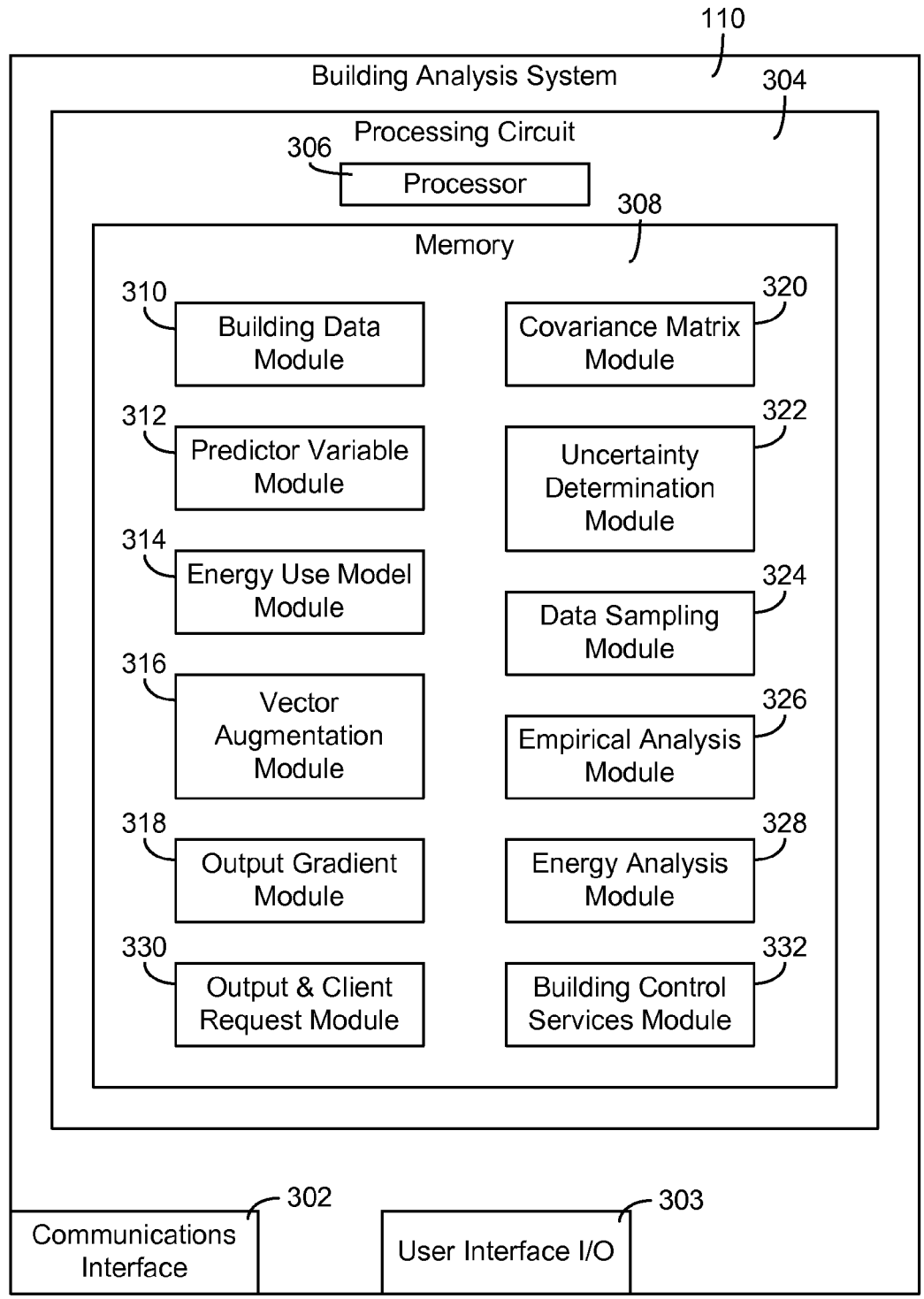
FIG. 3 is a block diagram illustrating the building analysis system of FIG. 1 in greater detail, according to an exemplary embodiment.

Referring now to FIG. 3, a block diagram illustrating a building analysis system 110 in greater detail is shown, according to an exemplary embodiment. Building analysis system 110 may be configured to receive an energy use model for a building site. The energy use model may have one or more predictor variables and one or more model parameters. Building analysis system 110 may calculate a gradient of an output of the energy use model (e.g., predicted energy consumption) with respect to the model parameters and determine a covariance matrix using the calculated gradient. Building analysis system 110 may use the covariance matrix to identify an uncertainty of the model parameters (e.g., regression coefficients of the energy use model, one or more balance points, etc.). For example, the uncertainties of the model parameters may correspond to various entries in the covariance matrix and building analysis system 110 may identify the various uncertainties by inspection thereof.

Building analysis system 110 is shown to include a communications interface 302, a user interface I/O 303, and a processing circuit 304. Communications interface 302 may include wired or wireless interfaces (e.g., jacks, antennas, transmitters, receivers, transceivers, wire terminals, etc.) for conducting electronic data communications with the various components of building data acquisition system 100 or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 302 can include an Ethernet card and port for sending and receiving data via an Ethernet-based communications link or network. In various embodiments, communications interface 302 can include a WiFi transceiver, a cellular transceiver, or a mobile phone transceiver for communicating via a wireless communications network.

Communications interface 302 may receive energy-related performance data for a building or building site. Performance data may include, for example, energy consumption data, energy cost data, energy demand data, outside air temperature data, historical weather or meteorological data, pricing or billing data (e.g., from an energy provider), predicted energy usage data, or other energy-related data associated with a building or building site. In some embodiments, the performance data includes a plurality of data points including at least one weather-related predictor variable (e.g., outside air temperature/enthalpy, cooling degree days, heating degree days, cooling energy days, heating energy days, etc.).

In some embodiments, communications interface 302 receives an energy use model for the building or building site. The energy use model may have known model parameters or unknown model parameters. In other embodiments, building analysis system 110 constructs the energy use model using the energy-related performance data. In some embodiments, communications interface 302 receives an indication of an appropriate model parameter order and/or an indication of one or more specific parameters to include in the energy use model. Building analysis system 110 may determine values for the model parameters (e.g., using a regression technique or any other system identification process).

Still referring to FIG. 3, building analysis system 110 is shown to include a user interface I/O 303. User interface I/O 303 may include one or more user interface input and/or output devices for facilitating user interaction with building analysis system 110. User interface I/O 303 may include, for example, a local display (e.g., a LCD panel, an electronic display screen, one or more indicator lights, etc.), a keyboard, a mouse, a printer, a microphone, a speaker, a touch-sensitive panel, a camera, a scanner, one or more user-operable buttons, dials, sliders, switches, or any other type of user interface device.

User interface I/O 303 may be used to receive input from a user (e.g., physical input, verbal input, etc.) and to provide output to a user in a user-comprehensible format (e.g., text, numbers, words, sounds, status indicators, visual displays, printouts, etc.). For example, a user may interact with user interface I/O 303 to submit a request for information regarding the parameter order of a particular building energy use model. Building analysis system 110 may process the user request and provide the user with an output (e.g., a visual display, a textual/graphical output, etc.) indicating the parameter order of the particular building energy use model. As another example, a user may interact with user interface I/O to request a performance analysis report for a particular building or building system. Building analysis system 110 may process the request and provide the user with an output (e.g., a visual display, a textual/graphical report, etc.) analyzing the performance of the particular building or building system.

In various embodiments, user input may be received locally (e.g., via user interface I/O 303) or remotely (e.g., via a LAN connection, a WAN connection, a network connection, an Internet connection, etc.) from a remote user interface client (e.g., a remote computer, a remote user device, etc.). User output may also be provided locally to a user interacting with building analysis system 110 via user interface I/O 303 or remotely to a user interacting with building analysis system 110 via a remote user interface client (e.g., a remote computer, over a network, etc.). In some embodiments, user input and user output may be sent and received via communications interface 302, user interface I/O 303, and/or a combination of both communications interface 302 and user interface I/O 303.

Still referring to FIG. 3, building analysis system 110 is shown to include a processing circuit 304. In some embodiments, processing circuit 304 is a component of building analysis system 110. In other embodiments, processing circuit 304 is a component of any other computing device or system configured to analyze energy-related characteristics and/or statistics of a building site. In some embodiments, the various components of processing circuit 304 may be distributed across multiple computing devices or systems.

Processing circuit 304 is shown to include a processor 306 and memory 308. Processor 306 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 306 may be configured to execute computer code stored in memory 308 to complete and facilitate the activities described herein.

Memory 308 may include one or more devices (e.g., RAM, ROM, solid state memory, hard disk storage, etc.) for storing data and/or computer code for completing or facilitating the various processes, layers, and modules of the present disclosure. Memory 308 may include volatile memory or non-volatile memory. Memory 308 may include database components, object code components, script components, or any other type of information structure for supporting the various activities and information structures of the present disclosure. According to an exemplary embodiment, memory 308 is communicably connected to processor 306 via processing circuit 304 and includes computer code for executing (e.g., by processing circuit 304 and/or processor 306) one or more processes described herein. In brief overview, memory 308 is shown to include a building data module 310, a predictor variable module 312, an energy use model module 314, a vector augmentation module 316, an output gradient module 318, a covariance matrix module 320, an uncertainty identification module 322, a data sampling module 324, an empirical analysis module 326, an energy analysis module 328, an output and client request module 330, and a building control services module 332.

Still referring to FIG. 3, memory 308 is shown to include a building data module 310. Building data module 310 may obtain and/or store building data related to buildings 102-106. In some embodiments, building data includes data relating to the physical characteristics of a building. For example, building data may include data regarding a building's geographic location (e.g., street address, city, coordinates, etc.), dimensions (e.g., floor space, stories, etc.), classification (e.g., office space, hospital, school, etc.), building materials, or any other physical characteristic which may be used to describe a building.

In some embodiments, building data includes energy-related performance data for buildings 102-106. Energy-related performance data may include, for example energy consumption data (e.g., current energy usage, historical energy usage, predicted energy usage, etc.), measured temperatures or other sensory data obtained by one or more sensory devices of buildings 102-106, and/or control parameters (e.g., set points, tuning parameters, threshold values, etc.) used to regulate the temperature or other variables within buildings 102-106. In some embodiments, building data includes baseline energy consumption data (e.g., a base load $E_0$), balance point data (e.g., a heating balance point $T_{bH}$, a cooling balance point $T_{bC}$, a single balance point which is both the heating balance point $T_{bH}$ and the cooling balance point $T_{bC}$, etc.), heating or cooling slope data (e.g., a heating slope $S_H$, a cooling slope $S_C$, etc.), or other data describing the parameters used in an energy use model for a particular building or building site.

In some embodiments, building data may include billing data from one or more utilities (e.g., utility 114) that supply buildings 102-106 with a consumable resource. For example, building data may include billing data from a utility that provides the building with electrical power. In another example, building data may include billing data from a utility that supplies water to the building.

In some embodiments, building data module 310 uses the building data to calculate one or more normalized metrics. For example, building data module 310 may normalize the building's energy consumption using the building's internal volume or area. The normalized energy consumption may be expressed as an energy consumption per unit area $$\left(\text{e.g., } \frac{\text{kWh}}{\text{ft}^2}\right)$$

and/or an energy consumption per unit volume $$\left(\text{e.g., } \frac{\text{kWh}}{\text{ft}^3}\right).$$

The normalized metrics may be used by building analysis system 110 to compare the energy consumption of buildings having different sizes, areas, and/or volumes.

Building data module 310 may store a plurality of energy consumption values in a data set. The energy consumption values may correspond to a plurality of observations of the building's energy consumption (e.g., at various times, at various locations, etc.). In some embodiments, building data module 310 stores energy consumption observations in an energy consumption vector Y. Energy consumption vector Y may have a size of n×1 (i.e., a single-dimensional vector), where n is the total number of observations of the building's energy consumption or power use.

Still referring to FIG. 3, memory 308 is shown to include a predictor variable module 312. Predictor variable module 312 may obtain and store data relevant to one or more predictor variables used in an energy use model for a building or building site. In some embodiments, predictor variable data includes weather data for one or more geographic locations. For example, weather data may include historical, current, or predicted data regarding a location's temperature (e.g., outside air temperature), humidity, atmospheric pressure, wind speed, precipitable water, or other weather-related data. In some embodiments, weather data may be gathered via sensors located at or near buildings 102-106. In some embodiments, weather data includes TMY data (e.g., TMY2 data, TMY3 data, etc.). Weather data may include weather data from any number of different time periods having any degree of granularity. For example, weather data may identify weather conditions on a monthly, weekly, daily, or hourly level.

In some embodiments, predictor variable module 312 uses the weather data to calculate a value for a weather-related predictor variable. The weather-related predictor variable may be any variable that depends on a weather-related value (e.g., outside air temperature $T_{OA}$, enthalpy, humidity, pressure, wind speed, precipitation level, etc.). For example, the weather-related predictor variable may be a cooling degree day (CDD) value, a heating degree day (HDD) value, a cooling energy day (CED) value, or a heating energy day (HED) value.

A CDD or HDD value may represent the amount of heating or cooling needed by the building over a period of time. In some embodiments, predictor variable module 312 calculates the CDD and HDD values for a building by integrating the difference between the outside air temperature $T_{OA}$ of the building and a given temperature over a period of time. The given temperature may be a cooling balance point for the building (e.g., cooling balance point $T_{bC}$ 210) to determine a CDD value, or heating balance point for the building (e.g., heating balance point $T_{bH}$ 208) to determine a HDD value. For example, CDD and HDD values for the building over the course of a month may be calculated as follows:

$$CDD = \int^{month} \text{Max}\{0, (T_{OA} - T_{bC})\} dt$$

$$HDD = \int^{month} \text{Max}\{0, (T_{bH} - T_{OA})\} dt$$

In some embodiments, the value for one or more of the predictor variables is a function of a heating balance point or a cooling balance point. In other embodiments, a set reference temperature may be used to calculate a building's CDD or HDD value instead of the building's actual balance point. For example, a reference temperature of 65° F. may be used as a fixed value to compare with the building's outdoor air temperature. CED and HED values may be calculated in a similar manner using outside air enthalpy rather than outside air temperature $T_{OA}$.

In some embodiments, predictor variable module 312 obtains and stores data relating to one or more non-weather-related predictor variables. Non-weather-related predictor variables may include, for example, water consumption, building occupancy, days off, the number of days per period, and/or any other variable which may affect the building's energy consumption.

Predictor variable module 312 may store values for each predictor variable in a data set. In some embodiments, predictor variable module 312 stores the values for the predictor variables in a predictor variable matrix X. The predictor variable matrix X may have a size of n by p+1, where n is the total number of observations and p+1 is the total number of predictor variables including a time variable t indicating the duration of each observation period. (e.g., $t = [t_1 \ldots t_n]^T$).

Still referring to FIG. 3, memory 308 is shown to include an energy use model module 314. Energy use model module 314 may store one or more energy use models for a building or building site. The one or more energy use models may be of any form. For example, energy use model module 314 may store parametric models (e.g., linear regression models, non-linear regression models, etc.), non-parametric models (neural networks, kernel estimation, hierarchical Bayesian, etc.), or something in between (e.g., Gaussian process models). In some embodiments, energy use model module 314 receives one or more energy use models via communications interface 302. In other embodiments, energy use model module 314 generates one or more energy use models using the energy consumption data stored in building data module 310 (e.g., energy consumption vector Y) and the predictor variable data stored in predictor variable module 312 (e.g., predictor variable matrix X).

In some embodiments, energy use model module 314 models the energy use of a building using linear regression. A linear regression model for a building may be represented by the following equation:

$$Y = X\beta + e,$$

where Y is the building's energy consumption, X is a predictor variable matrix, $\beta$ is a vector of unknown regression coefficients having a size of p+1 (e.g., $\beta_0, \beta_1, \ldots \beta_p$), and e is the model error such that $e \sim N(0, t_k \sigma^2)$.

The predictor variable matrix X may have a size of n by p+1 where n is the total number of observations and where the number p+1 includes p predictor variables (e.g., $x_1 \ldots x_p$) and a time variable t representing the duration of each observation period (e.g., $t = [t_1 \ldots t_n]^T$). For example, the estimated energy consumption during the $k^{th}$ observation period can be expressed as:

$$\hat{y}_k = \beta_0 t_k + \beta_1 x_{1,k} + \beta_2 x_{2,k} + \ldots + \beta_p x_{p,k} + e_k,$$

where $t_k$ is the time duration of the $k^{th}$ observation period $k = 1 \ldots n$.

In some embodiments, modeling the energy use of a building using linear regression includes estimating the values of the parameter vector $\beta$. Energy use model module 314 may use any of a variety of different estimation techniques to estimate the values of the parameter vector $\beta$. In some embodiments, energy use model module 314 uses a partial least squares regression (PLSR) method. In other embodiments, energy use model module 314 may use other methods, such as ridge regression (RR), principal component regression (PCR), weighted least squares regression (WLSR), or ordinary least squares regression (OLSR).

Generally, a least squares estimation problem can be stated as follows: given a linear model $$Y = X\beta + e, \quad e \sim N(0, t_k \sigma^2),$$

find the vector $\hat{\beta}$ that minimizes the sum of squared error RSS, where $$RSS = \sum_{k=1}^{n} \frac{\hat{e}_k^2}{t_k} \text{ and } \hat{e} = \|Y - X\hat{\beta}\|.$$

The optimal value of $\hat{\beta}$ based on a least squares estimation has the solution $$\hat{\beta} = (X^T X)^{-1} X^T Y.$$

Given n observations of the dependent variable Y (e.g., building energy consumption) and the independent predictor variables X, energy use model module 314 may estimate the regression coefficient vector $\hat{\beta}$. The estimates of the regression coefficients $\hat{\beta}$ may have an asymptotic normal distribution such that $(\hat{\beta} - \beta) \sim \text{AsN}(0, P_\beta)$, where $P_\beta$ is a covariance matrix of $\hat{\beta}$ having a size of p+1 by p+1.

Still referring to FIG. 3, memory 308 is shown to include a vector augmentation module 316. Vector augmentation module 316 may be configured to augment (e.g., modify, add to, supplement, etc.) the vector of regression model coefficient estimates $\hat{\beta}$ to include one or more balance point parameters (e.g., a cooling balance point parameter $T_{bC}$ and/or a heating balance point parameter $T_{bH}$). For example, vector augmentation module 316 may combine the vector of regression model coefficient estimates $\hat{\beta}$ with one or more balance point parameter estimates $\hat{T}_{bC}$ and/or $\hat{T}_{bH}$ to create vector of parameter estimates $\hat{\theta}$ (e.g., $\hat{\theta} = [\hat{\beta} \ \hat{T}_{bC} \ \hat{T}_{bH}]^T$).

Advantageously, by combining the regression model coefficient estimates $\hat{\beta}$ and the balance point parameter estimates $\hat{T}_{bC}$ and $\hat{T}_{bH}$ into a single parameter vector $\hat{\theta}$, the values for the regression model coefficients $\hat{\beta}$ and the balance point parameters $\hat{T}_{bC}$ and $\hat{T}_{bH}$ may be estimated together using a single regression process.

In some embodiments, one or more of the predictor variables $x_1 \ldots x_p$ in the predictor variable matrix X is a function of a balance point parameter. For example, predictor variables $x_1$ and $x_2$ may correspond to cooling degree days (CDD) and heating degree days (HDD), respectively, and can be determined using the following equations:

$$x_{1,k} = f(\hat{T}_{bC}) = \int_{t_k} \max(0, T_{OA}(t) - \hat{T}_{bC}) dt$$

$$x_{2,k} = f(\hat{T}_{bH}) = \int_{t_k} \max(0, \hat{T}_{bH} - T_{OA}(t)) dt$$

These equations may be used to complete the predictor variable matrix X and to facilitate the simultaneous estimation of the regression model coefficients $\hat{\beta}$ and the balance point parameters $\hat{T}_{bC}$ and $\hat{T}_{bH}$.

Still referring to FIG. 3, memory 308 is shown to include an output gradient module 318. Output gradient module 318 may be configured to calculate a gradient $\psi(k, \hat{\theta})$ of the output of the energy use model with respect to the model parameters $\hat{\theta}$. The output of the energy use model may be energy consumption $\hat{y}_k = \beta_0 t_k + \beta_1 x_{1,k} + \beta_2 x_{2,k} + \ldots + \beta_p x_{p,k} + e_k$. Output gradient module 318 may calculate the gradient $\psi(k, \hat{\theta})$ according to the following equation:

$$\psi(k, \hat{\theta}) = \left[ \frac{\partial \hat{y}_k}{\partial \beta_0} \cdots \frac{\partial \hat{y}_k}{\partial \beta_p} \frac{\partial \hat{y}_k}{\partial T_{bC}} \frac{\partial \hat{y}_k}{\partial T_{bH}} \right]^T_{\theta = \hat{\theta}},$$

where the model parameters $\theta$ are evaluated at their estimated values $\hat{\theta}$, as indicated by the hat notation (e.g., $\hat{\theta} = [\hat{\beta} \ \hat{T}_{bC} \ \hat{T}_{bH}]^T$). Gradient $\psi(k, \hat{\theta})$ may be a vector having a size of p+3 (i.e., p+1 regression model coefficient $\beta$ terms and two balance point terms).

The terms of output gradient $\psi(k, \hat{\theta})$ with respect to the cooling balance point $T_{bC}$ $$\left( \text{i.e., } \frac{\partial \hat{y}_k}{\partial T_{bC}} \right)$$

and heating balance point $T_{bH}$ $$\left( \text{i.e. } \frac{\partial \hat{y}_k}{\partial T_{bH}} \right)$$

can be evaluated using the relationship between predictor variable $x_1$ and balance point $T_{bC}$ and the relationship between predictor variable $x_2$ and balance point $T_{bH}$. For example, terms $$\frac{\partial \hat{y}_k}{\partial T_{bC}} \text{ and } \frac{\partial \hat{y}_k}{\partial T_{bH}}$$

can be evaluated using the following equations:

$$\frac{\partial \hat{y}_k}{\partial T_{bC}} = \frac{\partial \hat{y}_k}{\partial x_{1,k}} \frac{\partial x_{1,k}}{\partial T_{bC}} = -\beta_1 t'_k$$

$$\frac{\partial \hat{y}_k}{\partial T_{bH}} = \frac{\partial \hat{y}_k}{\partial x_{2,k}} \frac{\partial x_{2,k}}{\partial T_{bH}} = \beta_2 t''_k,$$

where the variable $t'_k$ corresponds to the total time during observation period $t_k$ during which $T_{OA} > T_{bC}$, and where the variable $t''_k$ corresponds to the total time during observation period $t_k$ during which $T_{OA} < T_{bH}$. Output gradient module 318 may calculate the values for each of the terms in gradient $\psi(k, \hat{\theta})$ and store gradient $\psi(k, \hat{\theta})$ in memory.

Still referring to FIG. 3, memory 308 is shown to include a covariance matrix module 320. Covariance matrix module 320 may be configured to determine a covariance matrix $\hat{P}_\theta$ using the gradient $\psi(k, \hat{\theta})$. In some embodiments, covariance matrix module 320 may calculate covariance matrix $\hat{P}_\theta$ according to the following equation:

$$\hat{P}_\theta = \hat{\sigma}_e^2 \left[ \sum_{k=1}^{n} \psi(k, \hat{\theta}) \psi^T(k, \hat{\theta}) \right]^{-1},$$

where $\psi(k, \hat{\theta})$ is the output gradient calculated by output gradient module 318 and where $\hat{\sigma}_e$ is the estimated variance of the model error $$\left( \text{e.g., } \hat{\sigma}_e^2 = \frac{e^T e}{n - p - 1} \right).$$

Covariance matrix module 320 may generate a covariance matrix $\hat{P}_\theta$ having a size of p+3 by p+3.

Still referring to FIG. 3, memory 308 is shown to include an uncertainty determination module 322. Uncertainty determination module 322 may be configured to identify an uncertainty of one or more of the model parameter estimates $\hat{\theta}$. In some embodiments, uncertainty determination module 322 identifies the uncertainty in one or more of the model parameters in vector $\hat{\theta}$ using covariance matrix $\hat{P}_\theta$. The uncertainty of the $i^{th}$ parameter in vector $\hat{\theta}$ may correspond to the $i^{th}$ entry along the diagonal (i.e., from top left to bottom right) of covariance matrix $\hat{P}_\theta$. For example, the uncertainty of regression model coefficient $\beta_0$ (i.e., the first term in parameter vector $\hat{\theta}$) may correspond to the top left entry of covariance matrix $\hat{P}_\theta$ (i.e., the first entry along the diagonal from top left to bottom right). The uncertainty of balance points $T_{bC}$ and $T_{bH}$ (i.e., terms p+2 and p+3 in parameter vector $\hat{\theta}$) may correspond to entries p+2 and p+3, respectively, along the diagonal in covariance matrix $\hat{P}_\theta$.

Advantageously, uncertainty determination module 322 may use the covariance matrix $\hat{P}_\theta$ to determine the uncertainties in both the regression model parameters $\hat{\beta}$ and the balance point parameters $\hat{T}_{bC}$ and $\hat{T}_{bH}$. This advantage provides improved data analysis functionality over traditional methods which estimate the uncertainties for only the regression model coefficients $\hat{\beta}$ (and not the balance point parameters). Additionally, simultaneous estimation of the uncertainties in both the balance point parameters $\hat{T}_{bC}$ and/or $\hat{T}_{bH}$ and the regression model coefficients $\hat{\beta}$ may improve the certainty of any calculations which use the estimated model parameters $\hat{\theta}$. This improved certainty strengthens any conclusions based on the values and/or uncertainties of the model parameters $\hat{\theta}$ (e.g., in a LEAN energy analysis).

In some embodiments, building analysis system 110 estimates the uncertainties in model parameters $\hat{\theta}$ using the technique described with reference to memory modules 316-322. This technique may be referred to as the "analytical technique." In brief review, the analytical technique may include using vector augmentation module 316 to augment the vector of regression coefficients $\hat{\beta}$ with one or more balance points (e.g., $\hat{T}_{bC}$ and $\hat{T}_{bH}$) to produce a vector of model parameters $\hat{\theta}$. Output gradient module 318 may use the vector of model parameters $\hat{\theta}$ to calculate a gradient of the model output $\psi(k,\hat{\theta})$ with respect to the model parameters. Covariance matrix module 320 may then calculate a covariance matrix $\hat{P}_\theta$ using the gradient of the model output $\psi(k,\hat{\theta})$. Uncertainty determination module 322 may determine the uncertainties in the model parameters $\hat{\theta}$ by inspecting the covariance matrix $\hat{P}_\theta$.

In other embodiments, building analysis system 110 estimates the uncertainties in model parameters $\hat{\theta}$ using an empirical estimation technique. The empirical estimation technique may utilize a re-sampling method (e.g., a Bootstrap method, a Jackknife method, etc.) to generate multiple samples from the set of building performance data stored in building data module 310 and predictor variable module 312. For each of the multiple samples, an estimate of the model parameters $\hat{\theta}$ may be determined. The uncertainty in the model parameters $\hat{\theta}$ can then be calculated using the multiple estimates of the model parameters $\hat{\theta}$. The empirical estimation technique is explained in greater detail with reference to data sampling module 324 and empirical analysis module 326.

Still referring to FIG. 3, memory 308 is shown to include a data sampling module 324. Data sampling module 324 may receive a set of building performance data including values for one or more independent variables (e.g., predictor variables $x_{1,k} \ldots x_{p,k}$, time period duration $t_k$, etc.) and an associated energy consumption value $y_k$ for the building site. The set of building performance data may include n data points, each data point corresponding to an observation of the independent variable $y_k$ and the dependent variables $x_{1,k} \ldots x_{p,k}$ and $t_k$, where k=1 . . . n.

In some embodiments, the set of data points may be represented by a predictor variable matrix X and an energy consumption vector Y. The predictor variable matrix X may be a n by p+1 matrix including calculated or measured values for each of p predictor variables (i.e., $x_{1,k} \ldots x_{p,k}$) and a time variable $t_k$. The value of time variable $t_k$ may identify a time duration associated with each observation period k (e.g., number of hours or days per period, etc.). The predictor variable values and/or predictor variable matrix may be stored in predictor variable module 312. The energy consumption vector Y may include an energy consumption value $y_k$ associated with each observation period k, where k=1 . . . n. Each row of the predictor variable matrix X and energy consumption vector Y may correspond to a different data point or observation of the dependent and independent variables.

Data sampling module 324 may generate multiple samples from the set of data points. Each of the multiple samples may include a plurality of data points selected from the set of data points. In some embodiments, data sampling module 324 uses a Bootstrap sampling process to generate the multiple samples. Using the Bootstrap sampling process, data sampling module 324 may replace a predetermined number of data points in the set of data points with an equal number of data points selected randomly from the original set of data points (i.e., sampling with replacement). The Bootstrap sampling process may produce a sample having the same number of data points as the original set (e.g., n data points), with some of the data points potentially repeated multiple times. Data sampling module 324 may perform the Bootstrap sampling process multiple times to generate multiple samples from the set of data points.

In some embodiments, data sampling module 324 uses a Jackknife sampling process to generate the multiple samples. Using the Jackknife sampling process, data sampling module 324 may remove one of the data points from the original set of n data points to generate a sample of n−1 data points. Data sampling module 324 may perform the Jackknife process n times, removing a different data point each time. Using the Jackknife sampling process data sampling module 324 may generate n samples of n−1 data points. The $i^{th}$ Jackknife sample may include all of the data points in the original set of data points, except for the $i^{th}$ data point, where i=1 . . . n. Both the Bootstrap and the Jackknife method may be similar to the Monte Carlo method. However, with the Bootstrap and Jackknife methods, there is no assumption of any particular distribution.

Still referring to FIG. 3, memory 308 is shown to include an empirical analysis module 326. Empirical analysis module 326 may be configured to estimate the model parameters $\hat{\theta}$ for each of the multiple samples using the plurality of data points included in the sample. In some embodiments, empirical analysis module 326 estimates the model parameters $\hat{\theta}$ in multiple stages. For example, empirical analysis module 326 may first estimate the balance point or points for a particular data sample. Then, empirical analysis module 326 may use the estimated balance point(s) to calculate any predictor variable values that depend on a balance point (e.g., CDD and/or HDD values) and to determine the remaining building parameters (e.g., regression model coefficients $\hat{\beta}$).

In some embodiments, empirical analysis module 326 uses outside air temperature and energy consumption data to estimate the balance points (e.g., $\hat{T}_{bC}$ and/or $\hat{T}_{bH}$). For example, empirical analysis module 326 may analyze the energy consumption and outside air temperature data to identify a maximum outside air temperature (i.e., for heating balance point $\hat{T}_{bH}$) or a minimum outside air temperature (i.e., for cooling balance point $\hat{T}_{bC}$) below or above which building energy consumption is a function of the outside air temperature.

According to another embodiment, empirical analysis module 326 uses an optimization scheme to determine the balance point or points. The optimization scheme may include an exhaustive search of the balance points, a gradient descent algorithm, and/or a generalized reduced gradient (GRG) method to estimate balance points $\hat{T}_{bC}$ and/or $\hat{T}_{bH}$. In some embodiments, empirical analysis module 326 identifies the balance points using an iteratively reweighted least squares regression method. For example, empirical analysis module 326 may search for balance points that minimize the sum of squared error RSS of the building energy use model, where $$RSS = \sum_{i=1}^{n} \frac{\hat{e}_i^2}{t_i} \text{ and } \hat{e} = \|Y - X\hat{\beta}\|.$$

Empirical analysis module 326 may estimate balance point values for each of the multiple samples generated by data sampling module 324.

In some embodiments, empirical analysis module 326 uses the estimated balance points $\hat{T}_{bC}$ and/or $\hat{T}_{bH}$ to calculate values for any predictor variables that depend on a balance point (e.g., CDD, HDD, CED, HED, etc.). For example, if predictor variable $x_{1,k}$ corresponds to cooling degree days and predictor variable $x_{2,k}$ corresponds to heating degree days, empirical analysis module 326 may calculate values for predictor variables $x_{1,k}$ and $x_{2,k}$ using the following equations:

$$x_{1,k} = f(\hat{T}_{bC}) = \int_{t_k} \max(0, T_{OA}(t) - \hat{T}_{bC}) dt$$

$$x_{2,k} = f(\hat{T}_{bH}) = \int_{t_k} \max(0, \hat{T}_{bH} - T_{OA}(t)) dt$$

Empirical analysis module 326 may use the predictor variable values $x_{1,k} \ldots x_{p,k}$ and the associated energy consumption values $y_k$ to calculate the regression model coefficients $\hat{\beta}$. Empirical analysis module 326 may use any of a variety of different estimation techniques to estimate regression model coefficients $\hat{\beta}$. In some embodiments, empirical analysis module 326 uses a partial least squares regression (PLSR) method. In other embodiments, empirical analysis module 326 may use other methods, such as ridge regression (RR), principal component regression (PCR), weighted least squares regression (WLSR), or ordinary least squares regression (OLSR). The optimal value of $\hat{\beta}$ based on a least squares estimation has the solution $\hat{\beta} = (X^T X)^{-1} X^T Y$.

In some embodiments, empirical analysis module 326 uses the estimated balance points for each of the multiple samples to calculate an uncertainty in the balance point estimates. For example, the uncertainty in a balance point estimate $\hat{T}_b$ (i.e., $\hat{T}_{bC}$ or $\hat{T}_{bH}$) can be observed by examining the mean and standard deviation of the set of balance point estimates obtained from the multiple samples generated by data sampling module 324. The mean $\overline{T}_b$ and standard deviation $\sigma_{T_b}$ of the set of balance point estimates $\hat{T}_{b,1} \ldots \hat{T}_{b,N}$ can be determined using the following equations:

$$\overline{T}_b = \frac{1}{N} \sum_{j=1}^{N} \hat{T}_{b,j}$$

$$\sigma_{T_b} = \sqrt{\frac{1}{N} \sum_{j=1}^{N} (\hat{T}_{b,j} - \overline{T}_b)^2},$$

where N is the number of samples generated by data sampling module 324 and $\hat{T}_{b,j}$ is the $j^{th}$ balance point estimate, $j = 1 \ldots N$.

In some embodiments, empirical analysis module 326 calculates the uncertainties in the estimated values of the regression model coefficients $\hat{\beta}$ and the uncertainties in the estimated values of the balance points $\hat{T}_{bC}$ and/or $\hat{T}_{bH}$ simultaneously. Advantageously, simultaneously calculating the uncertainties in the regression model coefficients estimates and the balance point estimates may allow for a multidimensional uncertainty to be determined by empirical analysis module 326 for use by energy analysis module 328.

Still referring to FIG. 3, memory 308 is shown to include an energy analysis module 328. Energy analysis module 328 may be configured to analyze a building's energy performance using a building energy use model. Energy analysis module 328 may perform a variety of energy analysis functions including, for example, generating energy savings estimates, detecting outlier building sites with poor energy performance (e.g., by comparing similar building sites), detecting faults, and determining the effects of a fault on a building's energy consumption.

In some embodiments, energy analysis module 328 may perform energy analysis using a minimal amount of building performance data (e.g., a LEAN energy analysis). Energy analysis module 328 may rely on the values and corresponding uncertainties of parameters in the building energy use model (e.g., the parameters in parameter vector $\theta$) to arrive at conclusions regarding a building's energy performance.

In some embodiments, energy analysis module 328 is configured to perform outlier detection. Energy analysis module 328 may be configured to compare one or more statistics of a test building to the probability distribution of those statistics for the other buildings in the same class (e.g., buildings having similar usage characteristics, buildings located in similar geographic regions, etc.). For example, energy analysis module 328 may determine that a building's statistic is an outlier for the class based on a number of standard deviations that the statistic is above or below the mean for the class distribution. In various embodiments, energy analysis module 328 may use any number of outlier detection techniques to identify an outlier value. For example, energy analysis module 328 may use a generalized extreme studentized deviate test (GESD), Grubb's test, or any other form of univariate outlier detection technique. In some embodiments, energy analysis module 328 may identify a building as an outlier if the statistic for the building is within a fixed percentage of the minimum or maximum for the class distribution (e.g., top 5%, bottom 5%, top 10%, etc.).

In some embodiments energy analysis module 328 may use a distance value between statistics to detect an outlier. For example, energy analysis module 328 may determine a Mahalanobis distance to compare statistics. Such a distance may represent a statistical distance away from the typical building in the class. If the Mahalanobis distance for a test building is above a critical value, energy analysis module 328 may generate an indication that the building's one or more statistics are outliers in relation to the other buildings in the class. In some embodiments, energy analysis module 328 may project the distance onto the vector directions defining changes in a building's parameters to determine a root cause of the change. Other outlier detection techniques that may be used by energy analysis module 328 include, but are not limited to, Wilkes' method (e.g., if multivariate analysis is used) and various cluster analysis techniques.

Energy analysis module 328 may be configured to detect excessive energy consumption by a building. In some embodiments, energy analysis module 328 may perform one or more hypothesis tests using the building data stored in building data module 310 and the model parameters $\hat{\theta}$ to detect excessive energy consumption. Exemplary hypothesis tests include F-tests and Chi-squared tests. In some embodiments, hypothesis testing may be used to test one or more values against a baseline, as described in U.S. patent application Ser. No. 13/252,092 entitled "Systems and Methods for Detecting Changes in Energy Usage In a Building" and filed on Oct. 3, 2011, the entirety of which is incorporated by reference herein.

In some embodiments, energy analysis module 328 may be configured to detect faults and to determine the effects of a fault on a building's energy consumption. In various embodiments, energy analysis module 328 may determine one or more changes to the model parameters of the energy use model (e.g., changes to the parameters in parameter vector $\hat{\theta}$) that result when a particular fault is present. For example, energy analysis module 328 may determine changes to the set of vector parameters $\hat{\theta}$ that result from a damper being stuck in the open position. In one embodiment, energy analysis module 328 uses a simulation model to determine the changes to the energy use model parameters. In another embodiment, energy analysis module 328 determines a mapping between changes to a building's energy use model parameters and its physical parameters (e.g., the building's cooling slope $S_C$, heating slope $S_H$, cooling balance point $T_{bC}$, etc.).

Energy analysis module 328 may provide the changes to the energy use model parameters to energy use model module 314. Energy use model module 314 may then determine a corresponding change to the building's energy consumption. For example, a stuck damper of an AHU may cause a building's normalized annual energy consumption to increase by 25,000 kWh/year. Energy analysis module 328 may use this change in energy consumption to calculate a corresponding financial cost associated with the fault condition. For example, energy analysis module 328 may multiply the determined change in energy consumption by a price per unit energy (e.g., received from utility 114) to calculate a financial cost associated with the fault.

In some embodiments, energy analysis module 328 may be configured to perform fault detection and analysis of the building under study using the energy use model generated by energy use model module 314. In one embodiment, energy analysis module 328 may monitor changes to the building's energy use model's parameters over time to detect potential faults. In another embodiment, energy analysis module 328 may perform fault detection using peer analysis with other buildings in its class to detect potential faults. For example, buildings having outlier model parameter changes may be identified as having potential faults. If a potential fault is detected, energy analysis module 328 may use a mapping between energy use model parameters and the building's physical parameters to determine a cause of the fault.

Advantageously, the various energy analysis processes performed by energy analysis module 328 may be improved (e.g., improved accuracy, improved certainty, etc.) by calculating the uncertainties in the model parameters $\hat{\theta}$ using the systems and methods of the present disclosure.

Still referring to FIG. 3, memory 308 is shown to include an output and client request module 330. Output and client request module 330 may be configured to process user input received via communications interface 302 and/or user interface I/O 303. For example, output and client request module 330 may process a user request for the value of a model parameter and/or the uncertainty in a model parameter. As another example, output and client request module 330 may process a user request to run a performance analysis and/or generate an analytical performance analysis report for a particular building or building system. Output and client request module 330 may be configured to run or query uncertainty determination module 322, energy use model module 314, energy analysis module 328, or any other component of building analysis system 110 to determine a response to the user request.

Output and client request module 330 may be configured to generate an output for presentation to a user. Output and client request module 330 may generate a graphical display, a visual display, a textual display, or any other type of user-comprehensible output. Output and client request module 330 may communicate a result of a user query/request (e.g., an appropriate parameter order of a particular building energy use model, an analytical report, etc.), a result of an intermediate processing step (e.g., a test statistic or regression statistic value, etc.), a result of a performance analysis, a result of a fault detection analysis, or any other data stored or used by building analysis system 110. In various embodiments, output and client request module 330 may generate display data for presentation via a local display (e.g., to a local user interacting with building analysis system 110 via user interface I/O 303), or may communicate output data to a remote user via communications interface 302 (e.g., a user interacting with building analysis system 110 via a network connection and/or a remote client).

Still referring to FIG. 3, memory 308 is shown to include a building control services module 332. Building control services module 332 may be configured to control one or more buildings, building systems, or building subsystems using a building energy use model. For example, building control services module 332 may utilize closed loop control, feedback control, PI control, model predictive control, or any other type of automated building control methodology that relies on a model to translate an input into an output. In some embodiments, building control services module 332 uses the building energy use model maintained by energy use model module 314 along with the uncertainties of various model parameters to translate an input received from a building system into an output or control signal for the building system.

Building control services module 332 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 302 and/or user interface I/O 303. Building control services module 332 may apply the various inputs to a building energy use model to determine an output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Building control services module 332 may operate the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Figure 4:
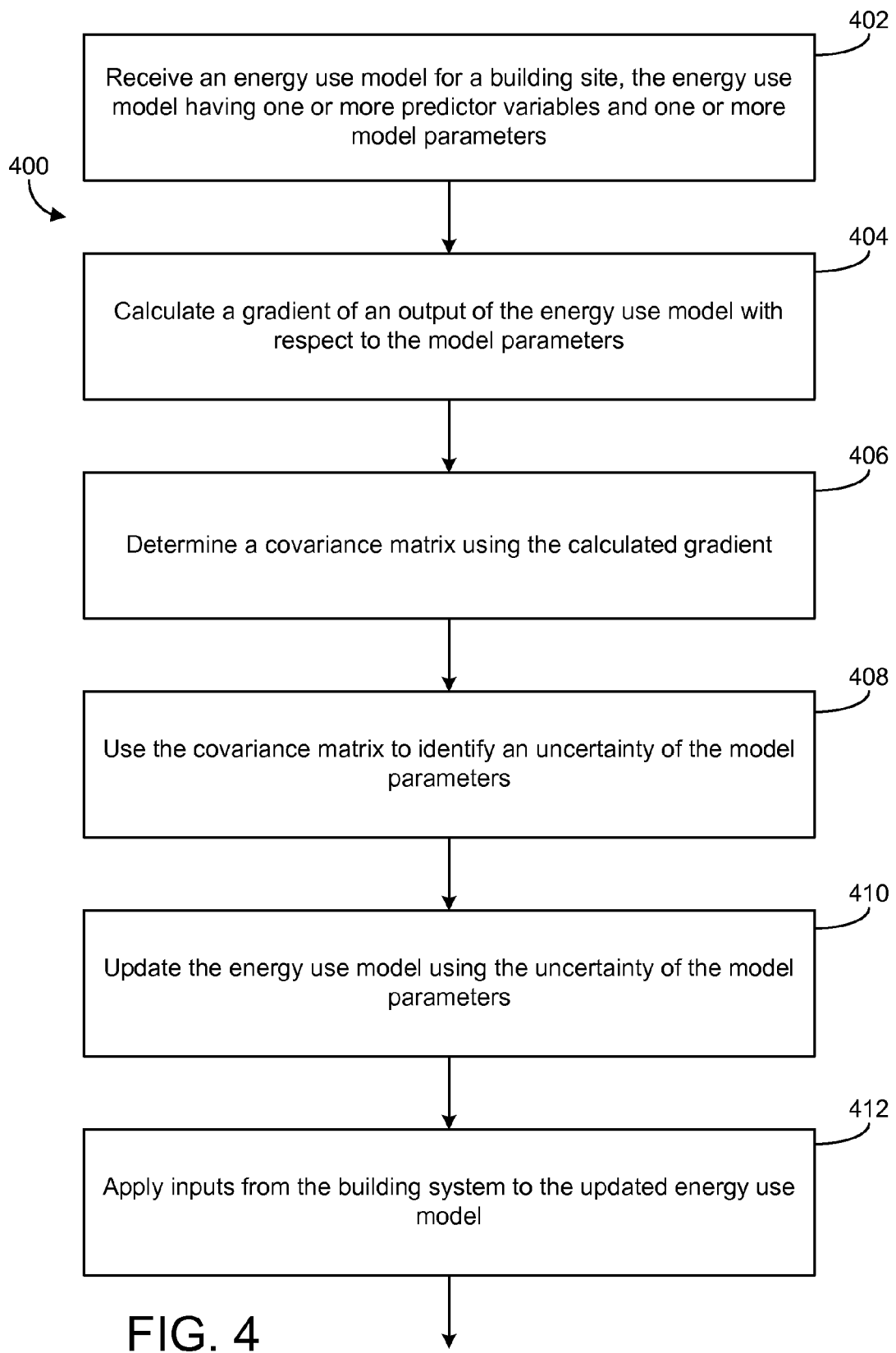
FIG. 4 is a flowchart of a process for determining the values and uncertainties of parameters of an energy use model using an analytical technique, according to an exemplary embodiment.
Figure 4:
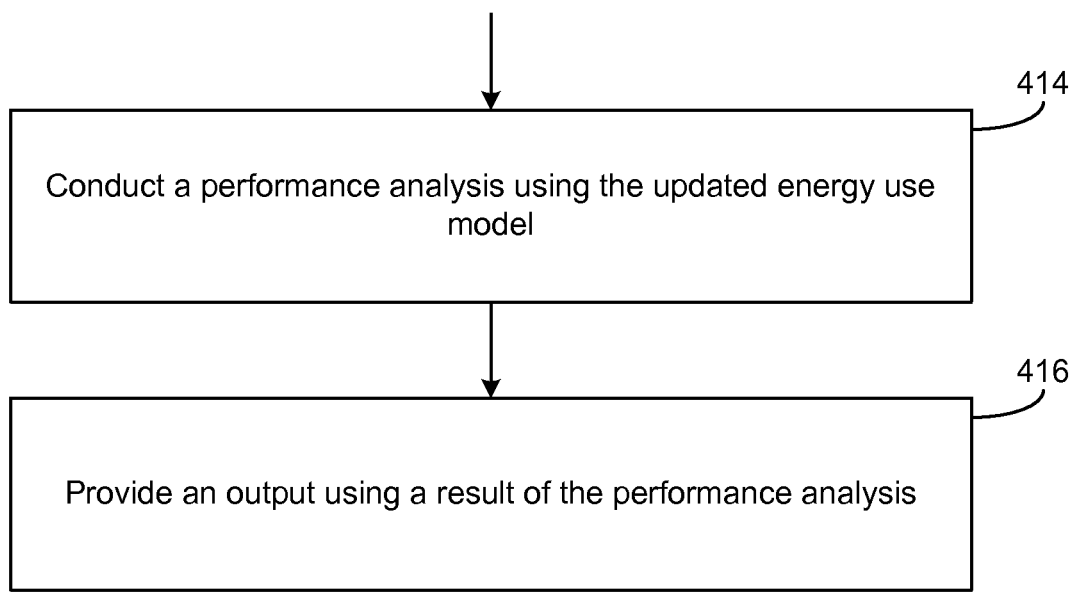

Referring now to FIG. 4, a flowchart of a process 400 for determining the uncertainty in parameters of a building energy use model is shown, according to an exemplary embodiment. In some embodiments, process 400 is performed by building analysis system 110 using processing circuit 304. Process 400 illustrates an analytical process for determining the uncertainties in a vector $\hat{\theta}$ of energy use model parameters. Vector $\hat{\theta}$ may include estimates for one or more balance point parameters (i.e., a cooling balance point parameter $\hat{T}_{bC}$ and/or a heating balance point parameter $\hat{T}_{bH}$) and one or more coefficients of a building energy use model (e.g., regression model coefficients $\beta$). Advantageously, process 400 may be used to estimate both the values and the uncertainties of the balance point parameters (e.g., $\hat{T}_{bC}$ and/or $\hat{T}_{bH}$) and the regression model coefficients $\beta$. This advantage provides improved data analysis functionality over traditional methods which estimate the uncertainties for only the regression model coefficients $\hat{\beta}$ (and not the balance point parameters).

In some embodiments, process 400 estimates the uncertainties in the values of the balance point parameters $\hat{T}_{bC}$ and/or $\hat{T}_{bH}$ and the uncertainties in the values of the regression model coefficients $\hat{\beta}$ simultaneously. Advantageously, simultaneous estimation of the uncertainties in both the balance point parameters $\hat{T}_{bC}$ and/or $\hat{T}_{bH}$ and the regression model coefficients $\beta$ may improve the uncertainties in all of the model parameters $\hat{\theta}$ over traditional uncertainty estimation techniques. The improved uncertainty strengthens any conclusions based on the values and/or uncertainties of the model parameters $\hat{\theta}$ (e.g., in a LEAN energy analysis).

Still referring to FIG. 4, process 400 is shown to include receiving an energy use model for a building site (step 402). The energy use model may be of any form including parametric models (e.g., linear regression models, non-linear regression models, etc.), non-parametric models (neural networks, kernel estimation, hierarchical Bayesian, etc.), or something in between (e.g., Gaussian process models). In some embodiments, step 402 includes receiving an energy use model from an external source (e.g., via communications interface 302). In other embodiments, step 402 includes generating the energy use model (e.g., using the building data stored in building data module 310 and/or the predictor variable data stored in predictor variable module 312).

In some embodiments, linear regression is used in step 402 to generate the energy use model. The energy use model may include one or more predictor variables and one or more model parameters. A linear regression model for a building may be represented by the following equation:

$$Y = X\beta + e,$$

where Y is the building's energy consumption, X is a predictor variable matrix, $\beta$ is a vector of unknown regression coefficients (e.g., $\beta_0 \beta_1, \ldots \beta_p$), and e is the model error such that $e \sim N(0, t_k \sigma^2)$.

The predictor variable matrix X may have a size of n by p+1 where n is the total number of observations and where the number p+1 includes p predictor variables (e.g., $x_1 \ldots x_p$) and a time variable t representing the duration of each observation period (e.g., $t = [t_1 \ldots t_n]^T$). For example, the estimated energy consumption during the $k^{th}$ observation period can be expressed as:

$$\hat{y}_k = \beta_0 t_k + \beta_1 x_{1,k} + \beta_2 x_{2,k} + \ldots + \beta_p x_{p,k} + e_k,$$

where $t_k$ is the time duration of the $k^{th}$ observation period $k = 1 \ldots n$.

In some embodiments, the energy use model includes a weather-related predictor variable (e.g., outside air temperature $T_{OA}$, enthalpy, cooling degree days, heating degree days, heating energy days, cooling energy days, etc.). In some embodiments, the energy use model includes only one weather-related predictor variable. In some embodiments, the energy use model includes one or more non-weather-related predictor variables. Non-weather-related predictor variables may include, for example, water consumption, building occupancy, days off, the number of days per period t, and/or any other variable which may affect the site's energy consumption. The weather-related predictor variable and/or other predictor variables may be included in predictor variable matrix X.

In some embodiments, step 402 includes augmenting (e.g., modify, add to, supplement, etc.) the vector of regression model coefficient estimates $\hat{\beta}$ with one or more balance point parameters (i.e., $\hat{T}_{bC}$ and/or $\hat{T}_{bH}$) to create vector of parameter estimates $\hat{\theta}$ (e.g., $\hat{\theta} = [\hat{\beta} \ \hat{T}_{bC} \ \hat{T}_{bH}]^T$). Advantageously, by combining the regression model coefficient estimates $\hat{\beta}$ and the balance point parameter estimates $\hat{T}_{bC}$ and $\hat{T}_{bH}$ into a single parameter vector $\hat{\theta}$, the uncertainties in the values for the regression model coefficients $\hat{\beta}$ and the uncertainties in the values for the balance point parameters $\hat{T}_{bC}$ and $\hat{T}_{bH}$ may be estimated simultaneously using a single regression process.

Still referring to FIG. 4, process 400 is shown to include calculating a gradient of an output of the energy use model with respect to the model parameters (step 404). The gradient of the output may be the gradient $\psi(k, \hat{\theta})$ of the energy consumption $\hat{y}_k$ with respect to the model parameters $\hat{\theta}$, where $\hat{y}_k = \beta_0 t_k + \beta_1 x_{1,k} + \beta_2 x_{2,k} + \ldots + \beta_p x_{p,k} + e_k$. In some embodiments, step 404 is performed by output gradient module 318 as described with reference to FIG. 3.

In step 404, the gradient $\psi(k, \hat{\theta})$ of the model output $\hat{y}_k$ may be calculated using the following equation:

$$\psi(k, \hat{\theta}) = \left[ \frac{\partial \hat{y}_k}{\partial \beta_0} \ \ldots \ \frac{\partial \hat{y}_k}{\partial \beta_p} \ \frac{\partial \hat{y}_k}{\partial T_{bC}} \ \frac{\partial \hat{y}_k}{\partial T_{bH}} \right]^T_{\theta = \hat{\theta}},$$

where the model parameters $\theta$ are evaluated at their estimated values $\hat{\theta}$, as indicated by the hat notation (e.g., $\hat{\theta} = [\hat{\beta} \ \hat{T}_{bC} \ \hat{T}_{bH}]^T$). Gradient $\psi(k, \hat{\theta})$ may be a vector having a size of p+3 (i.e., p+1 regression coefficient $\beta$ terms and two balance point terms).

In some embodiments, step 404 includes evaluating and/or simplifying the terms of output gradient $\psi(k, \hat{\theta})$. In some embodiments, one or more of the predictor variables $x_1 \ldots x_p$ in the predictor variable matrix X may be a function of a balance point parameter. For example, predictor variables $x_1$ and $x_2$ may correspond to cooling degree days (CDD) and heating degree days (HDD), respectively, and can be determined using the following equations:

$$x_{1,k} = f(\hat{T}_{bC}) = \int_{t_k} \max(0, T_{OA}(t) - \hat{T}_{bC}) dt$$

$$x_{2,k} = f(\hat{T}_{bH}) = \int_{t_k} \max(0, \hat{T}_{bH} - T_{OA}(t)) dt$$

The terms of output gradient $\psi(k,\hat{\theta})$ with respect to the cooling balance point $T_{bC}$ $$\left(\text{i.e., } \frac{\partial \hat{y}_k}{\partial T_{bC}}\right)$$

and heating balance point $T_{bH}$ $$\left(\text{i.e. } \frac{\partial \hat{y}_k}{\partial T_{bH}}\right)$$

can be evaluated using the relationship between predictor variable $x_1$ and balance point $T_{bC}$ and the relationship between predictor variable $x_2$ and balance point $T_{bH}$. For example, terms $$\frac{\partial \hat{y}_k}{\partial T_{bC}} \text{ and } \frac{\partial \hat{y}_k}{\partial T_{bH}}$$

can be evaluated using the following equations:

$$\frac{\partial \hat{y}_k}{\partial T_{bC}} = \frac{\partial \hat{y}_k}{\partial x_{1,k}} \frac{\partial x_{1,k}}{\partial T_{bC}} = -\beta_1 t'_k$$

$$\frac{\partial \hat{y}_k}{\partial T_{bH}} = \frac{\partial \hat{y}_k}{\partial x_{2,k}} \frac{\partial x_{2,k}}{\partial T_{bH}} = \beta_2 t''_k,$$

where the variable $t'_k$ corresponds to the total time during observation period $t_k$ during $T_{OA} > T_{bC}$, and where the variable $t''_k$ corresponds to the total time during observation period $t_k$ during which $T_{OA} < T_{bH}$. Step 404 may include substituting the values $-\beta_1 t'_k$ and $\beta_2 t''_k$ for terms $$\frac{\partial \hat{y}_k}{\partial T_{bC}} \text{ and } \frac{\partial \hat{y}_k}{\partial T_{bH}},$$

respectively.

Still referring to FIG. 4, process 400 is shown to include determining a covariance matrix $\hat{P}_\theta$ using the calculated gradient $\psi(k,\hat{\theta})$ (step 406). In some embodiments, step 406 is performed by covariance matrix module 320 as described with reference to FIG. 3. In some embodiments, step 406 includes calculating covariance matrix $\hat{P}_\theta$ according to the following equation:

$$\hat{P}_\theta = \hat{\sigma}_e^2 \left[ \sum_{k=1}^{n} \psi(k,\hat{\theta}) \psi^T(k,\hat{\theta}) \right]^{-1},$$

where $\psi(k,\hat{\theta})$ is the output gradient calculated in step 404 and where $\hat{\sigma}_e$ is the estimated variance of the model error $$\left(\text{e.g., } \hat{\sigma}_e^2 = \frac{e^T e}{n-p-1}\right).$$

Covariance matrix $\hat{P}_\theta$ may have a size of p+3 by p+3.

Still referring to FIG. 4, process 400 is shown to include using the covariance matrix to identify the uncertainty of the model parameters (step 408). In some embodiments, step 408 is performed by uncertainty determination module 322 as described with reference to FIG. 3. In some embodiments, step 408 includes identifying the uncertainty in one or more of the model parameters in vector $\hat{\theta}$ using covariance matrix $\hat{P}_\theta$. The uncertainty of the $i^{th}$ parameter in vector $\hat{\theta}$ may correspond to the $i^{th}$ entry along the diagonal (i.e., from top left to bottom right) of covariance matrix $\hat{P}_\theta$. For example, the uncertainty of regression model coefficient $\beta_0$ (i.e., the first term in parameter vector $\hat{\theta}$) may correspond to the top left entry of covariance matrix $\hat{P}_\theta$ (i.e., the first entry along the diagonal from top left to bottom right). The uncertainty of balance points $T_{bC}$ and $T_{bH}$ (i.e., terms p+2 and p+3 in parameter vector $\hat{\theta}$) may correspond to entries p+2 and p+3, respectively, along the diagonal in covariance matrix $\hat{P}_\theta$.

Advantageously, step 408 may be performed to determine the uncertainties in both the regression model parameters $\hat{\beta}$ and the balance point parameters $\hat{T}_{bC}$ and/or $\hat{T}_{bH}$. The uncertainties in both the regression model parameters and the balance point parameters may be calculated simultaneously in step 406 (i.e., by determining covariance matrix $\hat{P}_\theta$) and subsequently identified in step 408 as entries in the covariance matrix $\hat{P}_\theta$. This advantage provides improved data analysis functionality over traditional methods which estimate the uncertainties for only the regression model coefficients $\hat{\beta}$ (and not the balance point parameters). This improvement strengthens any conclusions based on the values and/or uncertainties of the model parameters $\hat{\theta}$ (e.g., in a LEAN energy analysis).

In some embodiments, process 400 includes performing a multivariate uncertainty analysis of two or more model parameters in $\hat{\theta}$ (e.g., a balance point parameter and a regression model coefficient). The regression model coefficient included in the multivariate uncertainty analysis may be associated with a weather-related predictor variable that is a function of the balance point parameter. The multivariate uncertainty analysis may serve as a tool for visualizing (e.g., identifying, determining, graphically representing, etc.) a correlation between model parameters (assuming a probability distribution of the balance point parameter and the corresponding regression model coefficient). For example, a correlation between model parameters may be identified and/or visualized in a graphical display (e.g., the graph illustrated in FIG. 2, a visual output of the model parameters or the uncertainties associated therewith, an energy consumption visualization based on the model parameters, etc.). Such a multivariate uncertainty analysis is not possible using traditional regression techniques which only calculate the uncertainties in the regression model coefficients $\hat{\beta}$.

In some embodiments, process 400 includes performing a multivariate outlier peer analysis. The multivariate outlier peer analysis may serve as a tool for visualizing (e.g., identifying, determining, graphically representing, etc.) a correlation between model parameters of multiple energy use models (e.g., for multiple building sites). Such a multivariate outlier peer analysis is made possible by the calculation of the uncertainties in the model parameters $\hat{\theta}$ and is not possible using traditional regression techniques which only calculate the uncertainties in the regression model coefficients $\hat{\beta}$.

Still referring to FIG. 4, process 400 is shown to include updating the energy use model using the uncertainty of the model parameters (step 410). In various embodiments, step 410 may include updating one or more regression coefficient values, updating one or more balance point values, or updating the uncertainties associated with the regression coefficient values and/or balance point values.

Step 410 may include updating the current energy use model to reflect the most recent data received from the building system. For example, step 410 may include using the most recent building data from building data module 310 and the most recent predictor variable data from predictor variable module 312 to update the energy use model maintained by energy use model module 314. Step 410 may include using vector augmentation module 316, output gradient module 318, covariance matrix module 320, and/or uncertainty determination module 322 to perform an iteration of the various processing steps described with reference to FIG. 3.

In some embodiments, step 410 includes obtaining a statistical distribution of the estimated energy consumption predicted by the energy use model based on the calculated covariance matrix $\hat{P}_\theta$ of the parameter vector $\hat{\theta}$. Step 410 may include performing a Monte Carlo simulation on the parameter vector $\hat{\theta}$. The simulation may assume a statistical distribution for the parameter vector $\hat{\theta}$. For example, assuming that the parameter vector $\hat{\theta}$ has a Gaussian distribution with a mean $\hat{\theta}$ and a covariance matrix $\hat{P}_\theta$, a set of m samples can be generated for $\theta$ (e.g., $\hat{\theta}_i$ where i=1,...,m). For each sample $\hat{\theta}_i$, the weather-related predictor variables in the energy use model (e.g., CDD, HDD, CED, HED, etc.) may be updated based on the values of the balance point parameter in the current sample. The energy use model can be evaluated at each parameter vector sample $\hat{\theta}_i$ and the most recent data points received from the building system to obtain a value for the estimated energy consumption vector $\hat{Y}_i$, where i=1,...,m. Step 410 may generate a set of m energy consumption vectors which can be used to determine the statistical distribution of the estimated energy consumption vector Y.

Step 410 may include one or more processing steps for propagating the uncertainty calculated for $\hat{\theta}$ to an uncertainty of $\hat{Y}$. The Monte Carlo simulation described above is an example of a heuristic implementation of such a processing step. In some embodiments, the uncertainty calculated for $\hat{\theta}$ may be propagated to an uncertainty of $\hat{Y}$ analytically rather than heuristically. A statistical distribution for the energy consumption vector $\hat{Y}$ may result in a higher confidence in any conclusions drawn based on the estimated energy consumption (e.g., yearly energy savings, fault detection, diagnostics, etc.).

Still referring to FIG. 4, process 400 is shown to include applying inputs to the updated energy use model (step 412). Inputs may include, for example, inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 302 and/or user interface I/O 303. Inputs may include measured variables indicating a current state or condition within a building or building system, setpoints, constraint conditions, control parameters, operating schedules, or other measured, calculated, or user-defined inputs.

Step 412 may include using the updated energy use model to translate the inputs into an output or control signal for the building system. For example, step 412 may include using closed loop control, feedback control, PI control, model predictive control, or any other type of automated building control methodology that relies on a model to translate an input into an output or control signal. In some embodiments, step 412 includes using a building energy use model that uses balance point parameters for which an uncertainty is estimated.

Step 412 may include applying the various inputs to a building energy use model to determine an output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Step 412 may include operating the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Still referring to FIG. 4, process 400 is shown to include conducting a performance analysis using the updated energy use model (step 414). In some embodiments, step 414 is performed by energy analysis module 328 as previously described with reference to FIG. 3. Step 414 may include analyzing a building's energy performance using the updated building energy use model to generate energy savings estimates, detect outlier building sites with poor energy performance (e.g., by comparing similar building sites), determine the effects of a fault on a building's energy consumption, or perform other energy analysis tasks In some embodiments, step 414 includes performing an energy analysis using a minimal amount of building performance data (e.g., a LEAN energy analysis). Step 414 may include using the number and value of parameters in the building energy use model (e.g., the parameters in parameter vector $\hat{\beta}$) to arrive at conclusions regarding a building's energy performance. By calculating the uncertainty in the various model parameters, the accuracy of the conclusions reached in step 414 may be improved.

In some embodiments, step 414 includes performing outlier detection. For example, step 414 may include comparing one or more statistics of a test building to the probability distribution of those statistics for the other buildings in the same class (e.g., buildings having similar usage characteristics, buildings located in similar geographic regions, buildings modeled by energy use models having the same number of parameters, etc.). Step 414 may include determining that a building's statistic is an outlier for the class based on a number of standard deviations that the statistic is above or below the mean for the class distribution. In various embodiments, step 414 includes using any number of outlier detection techniques to identify an outlier value. For example, step 414 may include using a generalized extreme studentized deviate test (GESD), Grubb's test, or any other form of univariate outlier detection technique. In some embodiments, step 414 includes identifying a building as an outlier if the statistic for the building is within a fixed percentage of the minimum or maximum for the class distribution (e.g., top 5%, bottom 5%, top 10%, etc.).

In some embodiments step 414 includes using a distance value between statistics to detect an outlier. For example, step 414 may include determining a Gaussian or Mahalanobis distance to compare statistics. Such a distance may represent a statistical distance away from the typical building in the class. If the Mahalanobis distance for a test building is above a critical value, step 414 may include generating an indication that the building's one or more statistics are outliers in relation to the other buildings in the class. In some embodiments, step 414 includes projecting the distance onto the vector directions defining changes in a building's parameters to determine the root cause. Other outlier detection techniques that may be used in step 414 include, but are not limited to, Wilkes' method (e.g., if multivariate analysis is used) and various cluster analysis techniques.

Step 414 may include detecting excessive energy consumption by a building. In some embodiments, step 414 includes performing one or more hypothesis tests using the building data stored in building data module 310 and the energy use model stored by energy use model module 314 to detect excessive energy consumption. Exemplary hypothesis tests include F-tests and Chi-squared tests. In some embodiments, hypothesis testing may be used to test one or more values against a baseline.

In some embodiments, step 414 includes determining the effects of a fault on a building's energy consumption. In various embodiments, step 414 includes determining one or more changes to the model parameters of the energy use model (e.g., changes to the parameters in parameter vector $\beta$) that result when a particular fault is present. For example, step 414 may include determining changes to the vector of model parameters $\beta$ that result from a damper being stuck in the open position. In one embodiment, step 414 includes using a simulation model to determine the changes to the energy use model parameters. In another embodiment, step 414 includes determining a mapping between changes to a building's energy use model parameters and its physical parameters (e.g., the building's cooling slope $S_C$, heating slope $S_H$, cooling balance point $T_{bC}$, etc.).

Step 414 may include providing the changes to the energy use model parameters to energy use model module 314. Energy use model module 314 may then determine a corresponding change to the building's energy consumption. For example, a stuck damper of an AHU may cause a building's normalized annual energy consumption to increase by 25,000 kWh/year. Energy analysis module 328 may use this change in energy consumption to calculate a corresponding financial cost associated with the fault condition. For example, energy analysis module 328 may multiply the determined change in energy consumption by a price per unit energy (e.g., received from utility 114) to calculate a financial cost associated with the fault.

In some embodiments, step 414 includes performing fault detection and analysis of the building under study using the updated building energy use model. In one embodiment, step 414 includes monitoring changes to the building's energy use model's parameters over time to detect potential faults. In another embodiment, step 414 includes performing fault detection using peer analysis with other buildings in its class to detect potential faults. For example, buildings having outlier model parameter changes may be identified as having potential faults. If a potential fault is detected, step 414 may include using a mapping between energy use model parameters and the building's physical parameters to determine the cause of the fault. Advantageously, determining the uncertainty in the model parameters (e.g., by uncertainty determination module 322) may facilitate (e.g., improve the accuracy of) the various energy analysis functions performed in step 414.

Still referring to FIG. 4, process 400 is shown to include providing an output using a result of the performance analysis (step 416). In some embodiments, step 416 includes generating display data for presentation to a user via a local display (e.g., to a local user interacting with building analysis system 110 via user interface I/O 303). In some embodiments, step 416 includes communicating a result of the performance analysis to a remote user, system, or device via communications interface 302 (e.g., a user interacting with building analysis system 110 via a network connection and/or a remote client). Step 416 may include generating an output for presentation to a user in a user-comprehensible format (e.g., visual display, graphical display, textual display, etc.) and/or storing a result of the performance analysis in a data storage device.

In some embodiments, step 416 includes using a result of the performance analysis to determine or change an output or control signal provided to a building system device. Step 416 may include providing the output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Step 416 may include operating the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Figure 5:
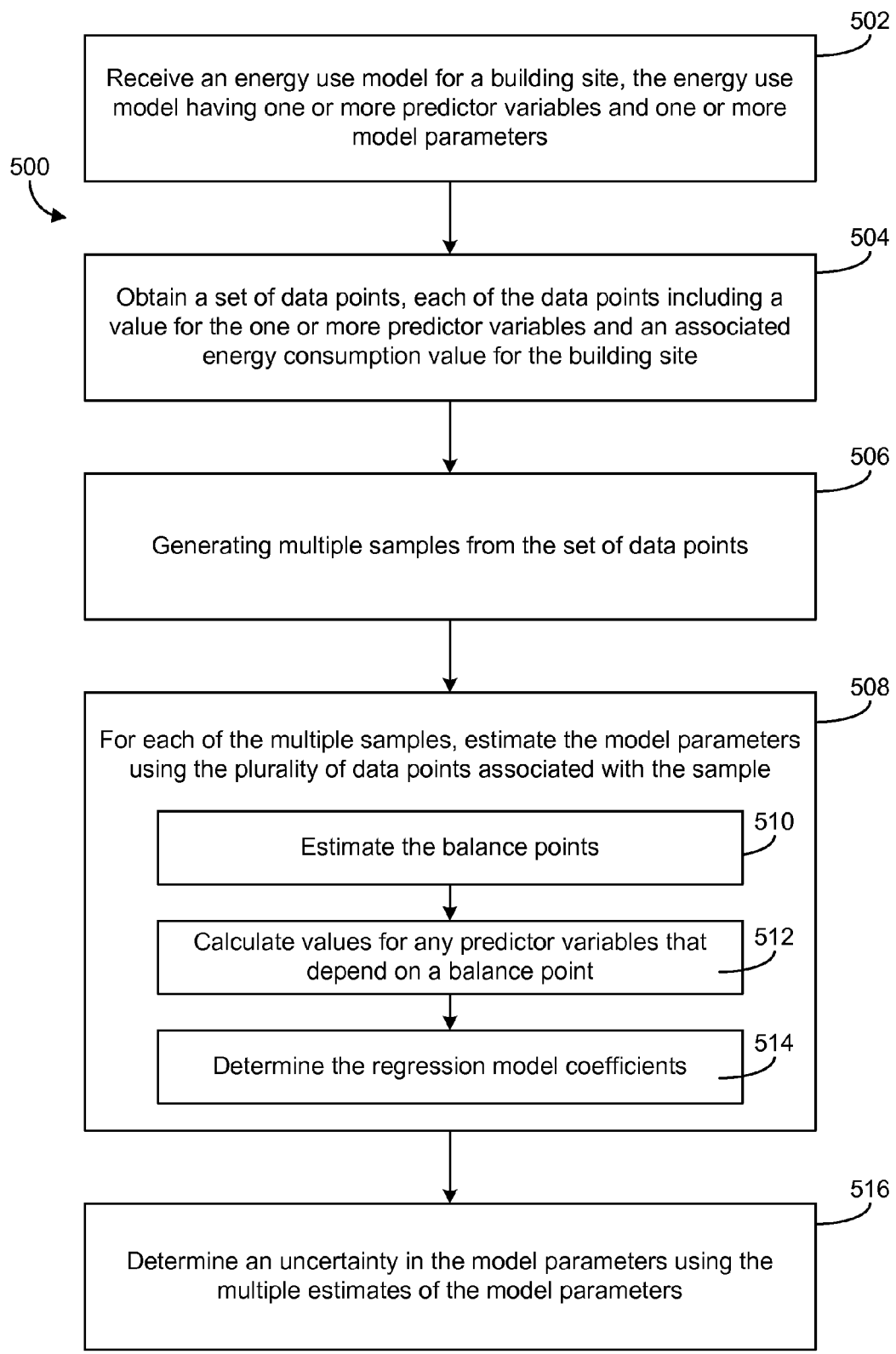
FIG. 5 is a flowchart of a process for determining the values and uncertainties of parameters of an energy use model using an empirical technique, according to an exemplary embodiment.

Referring now to FIG. 5, a flowchart of a process 500 for determining an uncertainty in parameters of a building energy use model is shown, according to an exemplary embodiment. In some embodiments, process 500 is performed by building analysis system 110 using processing circuit 304. Process 500 illustrates an empirical process for determining the uncertainties in a vector $\hat{\theta}$ of energy use model parameters. Vector $\hat{\theta}$ may include estimates for one or more balance point parameters (i.e., a cooling balance point parameter $\hat{T}_{bC}$ and/or a heating balance point parameter $\hat{T}_{bH}$) and one or more coefficients of a building energy use model (e.g., regression model coefficients $\hat{\beta}$).

Process 500 estimates the uncertainties in model parameters $\hat{\theta}$ using an empirical estimation technique. The empirical estimation technique may utilize a re-sampling method (e.g., a Bootstrap method, a Jackknife method, etc.) to generate multiple samples from the set of building performance data stored in building data module 310 and predictor variable module 312. For each of the multiple samples, an estimate of the model parameters $\hat{\theta}$ may be determined. The uncertainty in the model parameters $\hat{\theta}$ can then be calculated using the multiple estimates of the model parameters $\hat{\theta}$.

Still referring to FIG. 5, process 500 is shown to include receiving an energy use model for a building site (step 502). The energy use model may be of any form including parametric models (e.g., linear regression models, non-linear regression models, etc.), non-parametric models (neural networks, kernel estimation, hierarchical Bayesian, etc.), or something in between (e.g., Gaussian process models). In some embodiments, step 502 includes receiving an energy use model from an external source (e.g., via communications interface 302). In other embodiments, step 502 includes generating the energy use model (e.g., using the building data stored in building data module 310 and/or the predictor variable data stored in predictor variable module 312).

In some embodiments, linear regression is used in step 502 to generate the energy use model. The energy use model may include one or more predictor variables and one or more model parameters. A linear regression model for a building may be represented by the following equation:

$$Y = X\beta + e,$$

where Y is the building's energy consumption, X is a predictor variable matrix, $\beta$ is a vector of unknown regression coefficients (e.g., $\beta_0 \beta_1, \ldots \beta_p$), and e is the model error such that $e \sim N(0, t_k \sigma^2)$.

The predictor variable matrix X may have a size of n by p+1 where n is the total number of observations and where the number p+1 includes p predictor variables (e.g., $x_1 \ldots x_p$) and a time variable t representing the duration of each observation period (e.g., $t=[t_1 \ldots t_n]^T$). For example, the estimated energy consumption during the $k^{th}$ observation period can be expressed as:

$$\hat{y}_k = \beta_0 t_k + \beta_1 x_{1,k} + \beta_2 x_{2,k} + \ldots + \beta_p x_{p,k} + e_k,$$

where $t_k$ is the time duration of the $k^{th}$ observation period $k=1 \ldots n$.

In some embodiments, the energy use model includes a weather-related predictor variable (e.g., outside air temperature $T_{OA}$, enthalpy, cooling degree days, heating degree days, heating energy days, cooling energy days, etc.). In some embodiments, the energy use model includes only one weather-related predictor variable. In some embodiments, the energy use model includes one or more non-weather-related predictor variables. Non-weather-related predictor variables may include, for example, water consumption, building occupancy, days off, the number of days per period t, and/or any other variable which may affect the site's energy consumption. The weather-related predictor variable and/or other predictor variables may be included in predictor variable matrix X.

Still referring to FIG. 5, process 500 is shown to include obtaining a set of data points, each of the data points including a value for the one or more predictor variables and an associated energy consumption value for the building site (step 504). The predictor variables may include one or more independent variables of the energy use model (e.g., predictor variables $x_{1,k} \ldots x_{p,k}$, time period duration $t_k$, etc.). The energy consumption value for the building site may be the energy consumption value $y_k$. In some embodiments, the values for the predictor variables may be retrieved from predictor variable module 312 and the energy consumption values may be retrieved from building data module 310. In some embodiments, the set of data points includes n data points, each data point corresponding to an observation of the independent variable $y_k$ and the dependent variables $x_{1,k} \ldots x_{p,k}$ and $t_k$, where $k=1 \ldots n$.

In some embodiments, the set of data points may be represented by a predictor variable matrix X and an energy consumption vector Y. The predictor variable matrix X may be a n by p+1 matrix including calculated or measured values for each of p predictor variables (i.e., $x_{1,k} \ldots x_{p,k}$) and a time variable $t_k$. The value of time variable $t_k$ may identify a time duration associated with each observation period k. The predictor variable values and/or predictor variable matrix may be stored in predictor variable module 312. The energy consumption vector Y may include an energy consumption value $y_k$ associated with each observation period k, where $k=1 \ldots n$. Each row of the predictor variable matrix X and energy consumption vector Y may correspond to a different data point or observation of the dependent and independent variables.

Still referring to FIG. 5, process 500 is shown to include generating multiple samples from the set of data points (step 506). Each of the samples may include a plurality of data points selected from the set of data points. In some embodiments, step 506 includes using a Bootstrap sampling process to generate the multiple samples. Using the Bootstrap sampling process, step 506 may include replacing a predetermined number of data points in the set of data points with an equal number of data points selected randomly from the original set of data points (i.e., sampling with replacement). The Bootstrap sampling process may produce a sample having the same number of data points as the original set (e.g., n data points), with some of the data points repeated multiple times.

Step 506 may include performing the Bootstrap sampling process multiple times to generate multiple samples from the set of data points.

In some embodiments, step 506 includes using a Jackknife sampling process to generate the multiple samples. Using the Jackknife sampling process, step 506 may include removing one of the data points from the original set of n data points to generate a sample of n−1 data points. Step 506 may include performing the Jackknife sampling process n times, removing a different data point each time. Using the Jackknife sampling process, performing step 506 may generate n samples of n−1 data points. The $i^{th}$ Jackknife sample may include all of the data points in the original set of data points, except for the $i^{th}$ data point, where $i=1 \ldots n$. Both the Bootstrap and the Jackknife method may be similar to the Monte Carlo method. However, with the Bootstrap and Jackknife methods, there is no assumption of any particular distribution.

Still referring to FIG. 5, process 500 is shown to include, for each of the multiple samples, estimating the model parameters $\hat{\theta}$ using the plurality of data points associated with the sample (step 508). In some embodiments, step 508 is performed by empirical analysis module 326, as described with reference to FIG. 3. In some embodiments, step 508 includes estimating the model parameters $\hat{\theta}$ in multiple stages. For example, step 508 is shown to include estimating the balance point or points for a particular data sample (step 510), calculating the values for any predictor variables that depend on a balance point (step 512), and determining the regression model coefficients $\hat{\beta}$ (step 514).

In some embodiments, step 510 includes using outside air temperature and energy consumption data to estimate the balance points (e.g., $\hat{T}_{bC}$ and/or $\hat{T}_{bH}$). For example, the energy consumption and outside air temperature data may be analyzed to identify a maximum outside air temperature (i.e., for heating balance point $\hat{T}_{bH}$) or a minimum outside air temperature (i.e., for cooling balance point $\hat{T}_{bC}$) at which building energy consumption is a function of the outside air temperature.

According to another embodiment, step 510 includes using an optimization scheme to determine the balance point or points. The optimization scheme may include an exhaustive search of the balance points, a gradient descent algorithm, and/or a generalized reduced gradient (GRG) method to estimate balance points $\hat{T}_{bC}$ and/or $\hat{T}_{bH}$. In some embodiments, step 510 includes identifying the balance points using an iteratively reweighted least squares regression method. For example, step 510 may include searching for balance points that minimize the sum of squared error RSS of the building energy use model, where $$RSS = \sum_{i=1}^{n} \frac{\hat{e}_i^2}{t_i} \text{ and } \hat{e} = \|Y - X\hat{\beta}\|.$$

Step 510 may be performed multiple times to estimate balance point values for each of the multiple samples generated in step 506.

In some embodiments, step 508 includes using the estimated balance points $\hat{T}_{bC}$ and/or $\hat{T}_{bH}$ to calculate values for any predictor variables that depend on a balance point (step 512). Such predictor variables may be, for example, cooling degree days (CDD) and/or heating degree days (HDD), if the balance points are temperature balance points or cooling energy days (CED) and/or heating energy days (HED) if the balance points are enthalpy balance points. For embodiments in which predictor variable $x_{1,k}$ corresponds to cooling degree days and predictor variable $x_{2,k}$ corresponds to heating degree days, step 512 may include may calculating values for predictor variables $x_{1,k}$ and $x_{2,k}$ using the following equations:

$$x_{1,k} = f(\hat{T}_{bC}) = \int_{t_k} \max(0, T_{OA}(t) - \hat{T}_{bC}) dt$$

$$x_{2,k} = f(\hat{T}_{bH}) = \int_{t_k} \max(0, \hat{T}_{bH} - T_{OA}(t)) dt.$$

In some embodiments, step 508 includes determining values for the regression model coefficients $\hat{\beta}$ (step 514). Step 514 may include using the predictor variable values $x_{1,k} \ldots x_{p,k}$ and the associated energy consumption values $y_k$ to calculate the regression model coefficients $\hat{\beta}$. In step 514, any of a variety of different estimation techniques may be used to estimate regression model coefficients $\hat{\beta}$. In some embodiments, step 514 includes using a partial least squares regression (PLSR) method. In other embodiments, step 514 may include using other methods, such as ridge regression (RR), principal component regression (PCR), weighted least squares regression (WLSR), or ordinary least squares regression (OLSR). The optimal value of) $\hat{\beta}$ based on a least squares estimation has the solution $\hat{\beta} = (X^T X)^{-1} X^T Y$.

Still referring to FIG. 5, process 500 is shown to include determining an uncertainty in the model parameters using the multiple estimates of the model parameters (step 516). In some embodiments, step 514 includes using the estimated balance points for each of the multiple samples to calculate an uncertainty in the balance point estimates. For example, the uncertainty in a balance point estimate $\hat{T}_b$ (i.e., $\hat{T}_{bC}$ or $\hat{T}_{bH}$) can be observed by examining the mean and standard deviation of the set of balance point estimates obtained from the multiple samples generated by data sampling module 324. The mean $\overline{T}_b$ and standard deviation $\sigma_{T_b}$ of the set of balance point estimates $\hat{T}_{b,1} \ldots \hat{T}_{b,N}$ can be determined using the following equations:

$$\overline{T}_b = \frac{1}{N} \sum_{j=1}^{N} \hat{T}_{b,j}$$

$$\sigma_{T_b} = \sqrt{\frac{1}{N} \sum_{j=1}^{N} (\hat{T}_{b,j} - \overline{T}_b)^2},$$

where N is the number of samples generated by data sampling module 324 and $\hat{T}_{b,j}$ is the $j^{th}$ balance point estimate, $j = 1 \ldots N$.

In some embodiments, step 514 includes calculating the uncertainties of regression model coefficients $\hat{\beta}$ using a similar process. In other embodiments, the uncertainties in regression model coefficients $\hat{\beta}$ are estimated using the analytical technique described with reference to FIG. 4. Advantageously, the Bootstrap and Jackknife methods embodied in process 500 may be used to determine a balance point uncertainty and to provide information regarding how the balance point or points are distributed.

In some embodiments, process 500 includes performing a multivariate uncertainty analysis of two or more model parameters $\hat{\theta}$ (e.g., a balance point parameter and a regression model coefficient). The regression model coefficient included in the multivariate uncertainty analysis may be associated with a weather-related predictor variable that is a function of the balance point parameter. The multivariate uncertainty analysis may serve as a tool for visualizing a correlation between model parameters (assuming a probability distribution of the balance point parameter and the corresponding regression model coefficient). Such a multivariate uncertainty analysis is not possible using traditional regression techniques which only calculate the uncertainties in the regression model coefficients $\hat{\beta}$.

Figure 6:
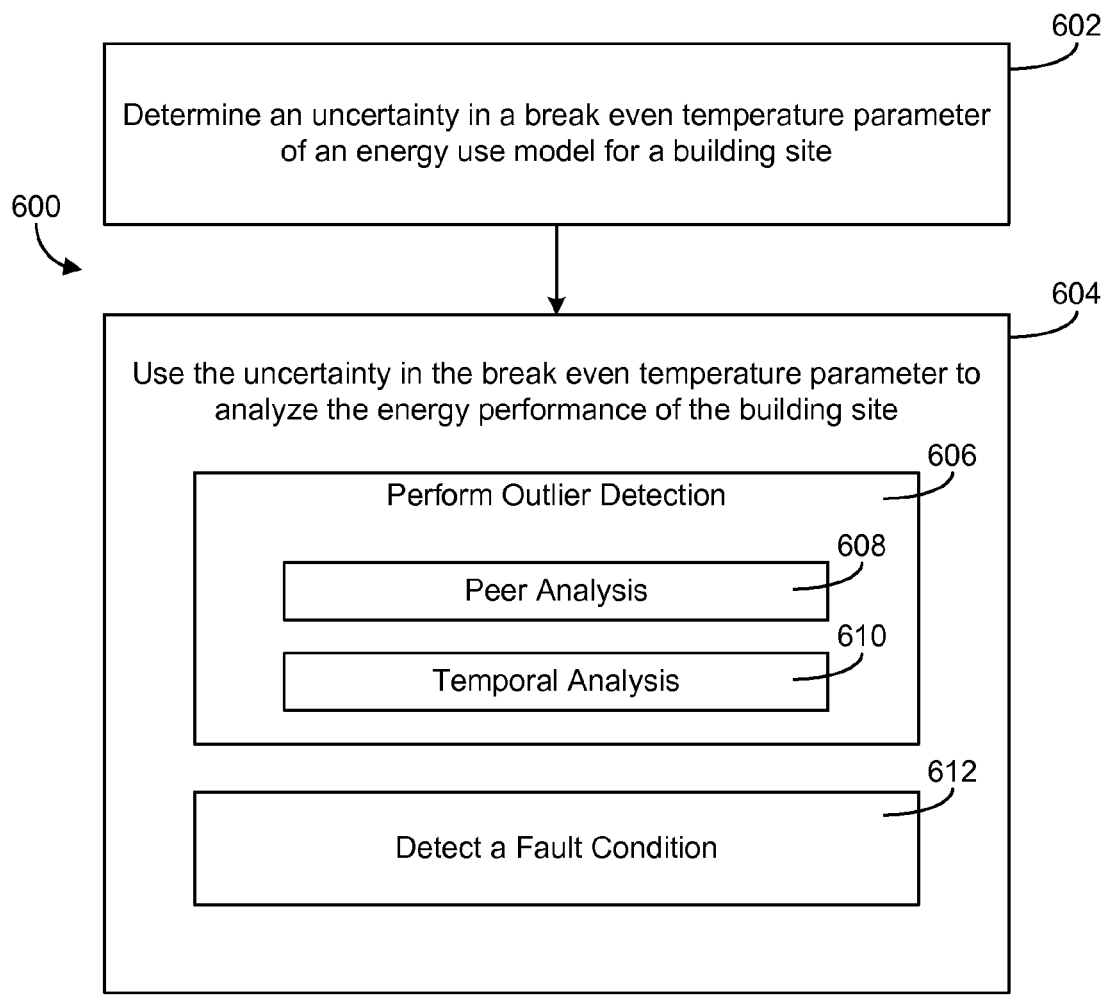
FIG. 6 is a flowchart of a process for analyzing the energy performance of a building site using an estimate of the uncertainty associated with one or more balance point parameters, according to an exemplary embodiment.

Referring now to FIG. 6, a flowchart of a process 600 for analyzing the energy performance of a building site is shown, according to an exemplary embodiment. In some embodiments, process 600 is performed by building analysis system 110 using processing circuit 304. In some embodiments, process 600 is performed subsequent to process 400 and/or process 500 and uses the results thereof. For example, process 600 may use the estimated model parameters $\hat{\theta}$ (i.e., balance point parameters $\hat{T}_{bC}$ and/or $\hat{T}_{bH}$ and estimated regression model coefficients $\hat{\beta}$) and their associated uncertainties to analyze the energy performance of a building site.

Process 600 is shown to include determining an uncertainty in a break even temperature parameter of an energy use model for a building site (step 602). The break even temperature parameter may be a heating balance point $\hat{T}_{bH}$ or a cooling balance point $\hat{T}_{bC}$. Step 602 may be accomplished by performing process 400 and/or process 500 as previously described with reference to FIGS. 4-5.

In some embodiments, step 602 includes simultaneously determining the uncertainty of the break even temperature parameter and an uncertainty of one or more additional parameters of the energy use model. Advantageously, simultaneously determining the uncertainties of both the break even temperature parameters and the one or more additional parameters may increase the accuracy of the estimated parameter values, thereby improving the accuracy of any subsequent energy performance analysis.

Still referring to FIG. 6, process 600 is shown to further include using the uncertainty in the break even temperature parameter to analyze the energy performance of the building site (step 604). Step 604 may be a specific implementation of step 410 as previously described with reference to FIG. 4. For example, step 604 may include generating energy savings estimates, detecting outlier building sites with poor energy performance (e.g., by comparing the model parameters and/or model parameter uncertainties of similar building sites), detecting faults in a building site (e.g., by performing a peer analysis and/or a temporal analysis of the model parameters), determining the effects of a fault on a building's energy consumption, and/or performing other energy analysis functions.

In some embodiments, step 604 includes performing an energy analysis using a minimal amount of building performance data (e.g., a LEAN energy analysis). In step 604, the values and associated uncertainties of parameters in the building energy use model (e.g., the parameters in parameter vector $\hat{\theta}$) may be used to arrive at conclusions regarding a building's energy performance.

In some embodiments, step 604 includes performing outlier detection (step 606). For example, step 606 may include comparing one or more statistics of a test building to the probability distribution of those statistics for other buildings in the same class (e.g., buildings having similar usage characteristics, buildings located in similar geographic regions, etc.) or to the same building from a different time period. In various embodiments, the statistics may be model parameters in parameter vector $\hat{\theta}$, values calculated from the model parameters $\hat{\theta}$, energy consumption statistics, normalized energy consumption (e.g., energy consumption per unit area or volume of the building site), or any other statistic generated from the model parameters $\hat{\theta}$, uncertainties in the model parameters, and/or performance data associated with a particular building site.

In some embodiments, step 606 includes performing a peer analysis of one or more test statistics for a class of buildings including the building site (step 608). The peer analysis may include calculating a difference between an energy use model parameter for the building site and a mean of the energy use model parameters for the class of buildings. The energy use model parameter may be a function of the break even temperature parameter (e.g., CDD, HDD, etc.), the break even temperature parameter itself, or another parameter in the building energy use model. In some embodiments, step 608 includes using the uncertainty in the break even temperature parameter to improve the accuracy of the calculation. For example, the uncertainty in the break even temperature may be used to more accurately determine the values for the energy use model parameter compared in the peer analysis. In some embodiments, step 608 includes detecting an outlier model parameter or an outlier building site based on the result of the peer analysis.

In some embodiments, step 606 includes performing a temporal analysis of one or more test statistics for the building site (step 610). The temporal analysis may include calculating a difference between a value for an energy use model parameter at a particular time and a mean of a set of values for the energy use model parameter. The set of values may include a plurality of values for the energy use model parameter at various times for the same building site. In some embodiments, step 610 includes detecting an outlier model parameter based on a result of the temporal analysis.

In some embodiments, step 604 includes detecting the existence of a fault condition (step 612). In some embodiments, step 612 includes monitoring the energy use model parameters for a change and detecting the fault condition in response to an observed change in one or more of the monitored parameters. Advantageously, the systems and methods of the present disclosure may improve the accuracy and/or certainty of the fault detection in step 612 by more accurately estimating the values for the uncertainties in the model parameters $\hat{\theta}$.

In some embodiments, step 604 includes determining an effect of a fault on a buildings energy consumption, calculating an energy savings opportunity for the building site, and/or using the model parameters $\hat{\theta}$ to detect excessive energy consumption. Using the systems and methods described herein, the model parameters $\hat{\theta}$ and their associated uncertainties can be determined more accurately than with traditional techniques, thereby resulting in more accurate energy savings estimates, outlier detection, and/or fault detection in process 600.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description or claims and is not admitted to be prior art by inclusion in the background section.

What is claimed is:

1. A method for determining an uncertainty in parameters of a building energy use model, the method comprising:
   receiving an energy use model for a building site, the energy use model having one or more model parameters, wherein the energy use model is used to predict an energy consumption of the building site as a function of the one or more model parameters and one or more predictor variables;
   calculating a gradient of an output of the energy use model with respect to the model parameters;
   determining a covariance matrix using the calculated gradient; and
   using the covariance matrix to identify an uncertainty of the model parameters.

2. The method of claim 1, wherein the uncertainty of the model parameters is a function of entries in the covariance matrix.

3. The method of claim 1, wherein at least one of the model parameters is a balance point parameter defining a range of outside air temperatures within which the output of the energy use model depends on the outside air temperature.

4. The method of claim 1, wherein at least one of the predictor variables is a function of a balance point parameter of the energy use model, wherein determining the covariance matrix comprises:
   identifying, in the energy use model, a predictor variable that is a function of the balance point parameter;
   identifying a regression coefficient associated with the identified predictor variable; and
   using a function of the identified regression coefficient as a gradient of the output of the energy use model with respect to the balance point parameter.

5. The method of claim 4, wherein the balance point is a threshold temperature value defining a range of outside air temperatures within which the output of the energy use model depends on the outside air temperature;

wherein the function of the identified regression coefficient is a product of the identified regression coefficient and a variable representing a total time duration during which the outside air temperature is within the outside air temperature range.

6. The method of claim 1, wherein determining the covariance matrix comprises determining a standard error of regression for the energy use model.

7. The method of claim 1, further comprising:

obtaining a plurality of data points, each of the data points comprising a value for the one or more predictor variables and an associated energy consumption value for the building site; and estimating the model parameters using the plurality of data points.

8. The method of claim 7, wherein obtaining the plurality of data points comprises, for each of the data points:

receiving at least one of: an observed temperature value and an observed enthalpy value; and calculating the value of the predictor variable using the observed temperature value or the observed enthalpy value.

9. The method of claim 1, wherein the one or more predictor variables comprise at least one weather-related predictor variable, wherein the weather-related predictor variable is at least one of: cooling degree days, heating degree days, cooling energy days, heating energy days, temperature, and enthalpy.

10. The method of claim 1, wherein the energy use model is at least one of: a non-linear energy use model, a piecewise linear energy use model, a three-parameter energy use model, and a five-parameter energy use model.

11. The method of claim 1, further comprising:

updating the uncertainty of the model parameters;

applying inputs to the energy use model;

conducting a performance analysis using the energy use model, wherein a result of the performance analysis is a function of one or more of the model parameters;

providing an output using the result of the performance analysis; and determining an uncertainty of the output using the updated uncertainty of the model parameters.

12. The method of claim 1, further comprising:

using the uncertainty of the model parameters to perform a multivariate uncertainty analysis of the model parameters.

13. The method of claim 12, wherein the multivariate uncertainty analysis allows for a visualization of a correlation between two or more of the model parameters.

14. The method of claim 12, wherein the multivariate uncertainty analysis allows for performing a multivariate peer analysis of the model parameters.

* * * * *